United States Patent
Kondo

(10) Patent No.: US 10,618,284 B2
(45) Date of Patent: Apr. 14, 2020

(54) SEALING MEMBER, SEALING MECHANISM, LIQUID EJECTION APPARATUS AND METHOD OF MANUFACTURING SEALING MECHANISM

(71) Applicant: CANON KABUSHIKI KAISHA, Tokyo (JP)

(72) Inventor: Soji Kondo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/200,444

(22) Filed: Nov. 26, 2018

(65) Prior Publication Data

US 2019/0168508 A1 Jun. 6, 2019

(30) Foreign Application Priority Data

Dec. 1, 2017 (JP) .................. 2017-231914

(51) Int. Cl.
*B41J 2/14* (2006.01)
*B41J 2/165* (2006.01)
*B29C 45/16* (2006.01)
*B41J 2/175* (2006.01)
*B29C 45/00* (2006.01)

(52) U.S. Cl.
CPC ........... *B41J 2/1433* (2013.01); *B29C 45/164* (2013.01); *B41J 2/165* (2013.01); *B41J 2/175* (2013.01); *B41J 2/1752* (2013.01); *B41J 2/17513* (2013.01); *B41J 2/17523* (2013.01); *B41J 2/17553* (2013.01); *B29C 2045/0063* (2013.01); *B29C 2045/1637* (2013.01); *B41J 2002/14362* (2013.01); *B41J 2202/12* (2013.01)

(58) Field of Classification Search
CPC . B41J 2/1433; B41J 2/165; B41J 2/175; B41J 2/17513; B41J 2/1752; B41J 2/17523; B41J 2/17553; B41J 2002/14362; B41J 2202/12; B29C 45/164; B29C 2045/0063; B29C 2054/1637
See application file for complete search history.

(56) References Cited

U.S. PATENT DOCUMENTS

| 6,130,696 A | * | 10/2000 | Mashita | ............... B41J 2/17523 347/29 |
| 6,871,944 B2 | * | 3/2005 | Kobayashi | ........... B41J 2/17506 347/86 |
| 2002/0089567 A1 | * | 7/2002 | Sato | ..................... B41J 2/14024 347/50 |
| 2005/0068381 A1 | * | 3/2005 | Morita | ..................... B41J 2/175 347/84 |

(Continued)

FOREIGN PATENT DOCUMENTS

JP 2006-007607 1/2006

*Primary Examiner* — Anh T Vo
(74) *Attorney, Agent, or Firm* — Venable LLP

(57) ABSTRACT

A sealing member, that is a resin molded product to be joined to a flow path forming member through which a fluid flows, has a surface including an opening constituting or including a portion of the flow path, a protrusion surrounding the circumference of the opening and a rib having one of its opposite ends connected to a part of the protrusion and the other end located inside or outside of the protrusion. The protrusion has at the top thereof a contact region to be pressed against and held in contact with the flow path forming member.

18 Claims, 20 Drawing Sheets

(56) References Cited

U.S. PATENT DOCUMENTS

| | | | |
|---|---|---|---|
| 2008/0316249 A1* | 12/2008 | Aoki | B41J 2/17509 347/19 |
| 2009/0278900 A1 | 11/2009 | Kondo et al. | 347/85 |
| 2009/0290003 A1 | 11/2009 | Udagawa et al. | 347/86 |
| 2015/0375512 A1 | 12/2015 | Kondo et al. | 347/86 |
| 2015/0375514 A1 | 12/2015 | Koshikawa et al. | 347/86 |
| 2016/0200113 A1 | 7/2016 | Nanjo et al. | 347/86 |
| 2016/0200114 A1 | 7/2016 | Nanjo et al. | 347/86 |
| 2017/0096010 A1 | 4/2017 | Nanjo et al. | B41J 2/17526 |
| 2017/0120606 A1 | 5/2017 | Koshikawa et al. | B41J 2/17559 |
| 2018/0015728 A1 | 1/2018 | Nanjo et al. | B41J 2/17526 |

\* cited by examiner

SEALING MEMBER, SEALING MECHANISM, LIQUID EJECTION APPARATUS AND METHOD OF MANUFACTURING SEALING MECHANISM

BACKGROUND OF THE INVENTION

Field of the Invention

The present disclosure involves an invention or inventions relating to a sealing member, a sealing mechanism, a liquid ejection apparatus and a method of manufacturing a sealing mechanism.

Description of the Related Art

A liquid ejection apparatus having a liquid ejection head for ejecting liquid (e.g., liquid ink) includes a liquid supply path for supplying liquid from a tank that stores liquid to the liquid ejection head. Additionally, liquid ejection apparatus designed to pump out liquid in a tank by applying air pressure to the liquid include those having an air supply path extending from the air pressure pump to the tank. At least part of the liquid supply path and also at least part of the air supply path are formed by joining a plurality of tubular members. Generally, at the joint sections where tubular members are joined together, the inside of the supply path is sealed relative to the outside of the supply path by means of an elastic member. Japanese Patent Application Laid-Open No. 2006-7607 discloses a sealing arrangement of providing an opening of a member (an ink passage port or an ink supply port) with a circumferential annular ridge to be driven to bite into the sealing surface of the mating member to be joined with the former member for the purpose of sealing the joint of the two members.

Sealing members for sealing a plurality of members that are joined together and also sealing the joints of such members are mostly resin molded products (injection-molded products). In some instances, such resin molded products have a weld formed at a part thereof where flows of liquid resin join together in the cavity of the metal mold for molding the product. When a deep weld is formed at a part of the resin molded product where two or more members of the resin molded products are joined together and sealed, there arises a risk of liquid leakage at the deep weld.

Meanwhile, liquid ejection apparatus have recently been required to operate for high speed recordings with a long service life. For high speed recording operations, high pressure is desirably applied to the liquid to be used for the recording operation. Then, the sealed areas of the apparatus are required to withstand high pressure for a long period of time. If a deep weld is formed at the sealing part of a resin molded product in the apparatus, air leakage can take place there to make it impossible to achieve a predetermined pressure level. Then, it will no longer be possible to realize high speed recording operations. For the sealing part to withstand high pressure for a long period of time, the weld that is formed at the sealing part needs to be minimized. While a highly fluid resin material is desirably employed to minimize the weld, the scope of additives that can be added to the resin materials to be used for forming members of liquid ejection apparatus is limited because the resin materials are required to show a high liquid-contactable property. In other words, lowly fluid resin materials inevitably need to be employed for such members of liquid ejection apparatus to make it difficult to minimize the weld that can be formed at such a member.

SUMMARY OF THE INVENTION

According to the present disclosure, there is provided a sealing mechanism that can achieve a high sealing effect by suppressing the risk of fluid leakage of gas and liquid attributable to the weld formed in the resin molded product of the sealing mechanism at the sealing part thereof sealing a joint of a plurality of members. The present disclosure also provides a liquid ejection apparatus having a sealing mechanism according to the present disclosure and incorporated therein.

In an aspect of the present disclosure, there is provided a sealing member that is a resin molded product to be joined to a flow path forming member for forming a flow path through which a fluid flows, the sealing member having a surface including: an opening constituting or including a portion of the flow path; a protrusion surrounding the circumference of the opening; and a rib having one of its opposite ends connected to a part of the protrusion and the other end located inside or outside of the protrusion, the protrusion having at the top thereof a contact region to be pressed against and held in contact with the flow path forming member.

In another aspect of the present disclosure, there is provided a sealing mechanism including: a plurality of flow path forming members joined together and forming a flow path through which a fluid flows; and a sealing member joined to the flow path forming members, either at least one of the flow path forming members or the sealing member being a resin molded product having a surface including: an opening constituting or including a portion of the flow path; a protrusion surrounding the circumference of the opening; and a rib having one of its opposite ends connected to a part of the protrusion and the other end located inside or outside of the protrusion, the protrusion having at the top thereof a contact region pressed against and held in contact with the counterpart member joined to the member that is either at least one of the flow path forming members or the sealing member.

In still another aspect of the present disclosure, there is provided a method of manufacturing a sealing mechanism including a plurality of flow path forming members joined together and forming a flow path through which a fluid flows and a sealing member joined to the flow path forming members, the method including molding either at least one of the flow path forming members or the sealing member by injecting a resin material into a cavity, wherein at the time of injecting the resin material: an opening constituting or including a portion of the flow path is formed by means of a pin arranged in the cavity; a protrusion surrounding the circumference of the opening is formed by means of a recess for forming a protrusion arranged around the pin; a rib having one of its opposite ends connected to a part of the protrusion and the other end located inside or outside of the protrusion is formed by means of a recess for forming a rib, the recess for forming a rib being connected to the recess for forming a protrusion; and gas remaining in the cavity moves from the recess for forming a protrusion to the recess for forming a rib as the recess for forming a protrusion is filled with the resin material injected into the cavity.

Further features of the present disclosure will become apparent from the following description of exemplary embodiments with reference to the attached drawings.

DESCRIPTION OF THE EMBODIMENTS

Now, several embodiments of the present disclosure will be described below by referring to the accompanying drawings. Note, however, that the following description does not limit the scope of an invention or inventions involved in the present disclosure by any means.

First Embodiment

The first embodiment relates to a sealing mechanism to be incorporated in a part of the flow path of a liquid ejection apparatus. This embodiment of sealing mechanism involves a plurality of flow path forming members (e.g., a liquid supply unit and a liquid ejection unit) and a sealing member to be connected to them for use. An exemplar specific configuration of the liquid ejection apparatus in which this embodiment of sealing mechanism is incorporated will be described hereinafter.

(Configuration of Sealing Member)

Figure 1A:
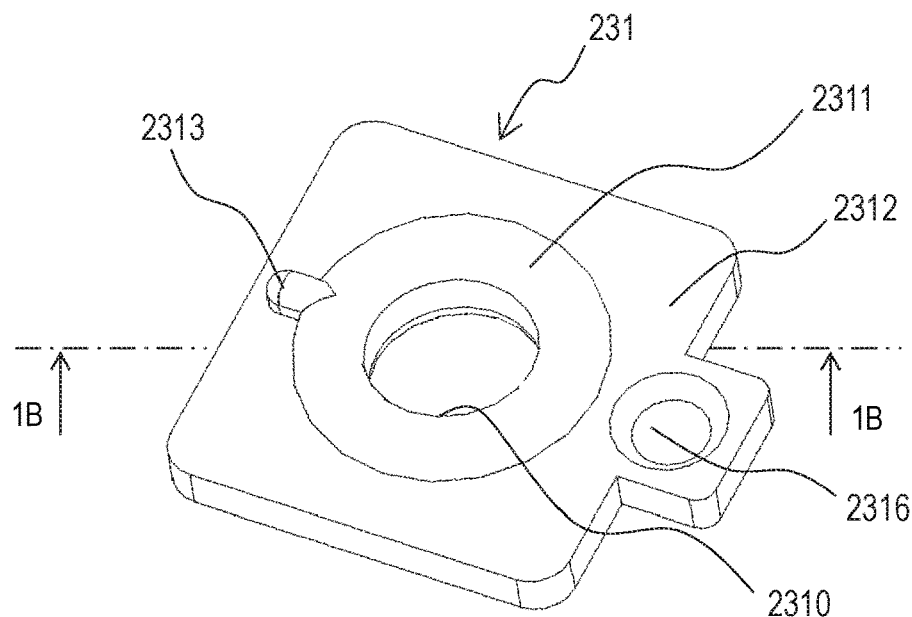
FIGS. 1A, 1B and 1C are schematic perspective views and a cross-sectional view of the first embodiment of sealing member and an embodiment that can be obtained by modifying the first embodiment of sealing member.

FIG. 1A schematically illustrates a sealing member 231 that this embodiment of sealing mechanism includes. This sealing member 231 is an elastic member for sealing the flow path formed by joining a plurality of flow path forming members (e.g., a negative pressure control unit and a liquid supply unit) relative to the outside of the flow path. The elastic member (sealing member) 231 is formed by using a plate 2312, boring a through hole 2310 that is an opening that includes a part of the flow path through the plate 2312 and arranging a base portion 2311, which is an annular protrusion, around the periphery of the through hole 2310. A rib 2313 is arranged at a part of the outer edge of the annular base portion 2311. While the rib 2313 is arranged at the outside of the annular base portion 2311 in this embodiment, the rib 2313 may alternatively be arranged at the inside of the annular base portion 2311. As seen from FIG. 1B, which is a cross-sectional view taken along line 1B-1B in FIG. 1A, the elastic member 231 shown in FIG. 1A has a symmetric shape relative to center plane CP that runs through the center of the plate 2312 as viewed in the thickness direction of the plate 2312 and extends in a direction running in parallel with the plate surfaces (and hence perpendicularly relative to the thickness direction of the plate 2312). The annular base portion 2311 shows a semicircular cross-sectional profile that projects in the thickness direction of the plate 2312 and is disposed on each of the opposite surfaces of the plate 2312 (the upper and lower surfaces in FIG. 1B). The rib 2313 is a substantially linearly projecting member that has a part (located at one of the opposite ends thereof) that is connected to a part of the outer edge of the annular base portion 2311 and another part (located at the opposite end thereof) located outside the annular base portion 2311. The rib 2313 also shows a semicircular cross-sectional profile that projects in the thickness direction of the plate 2312 and is arranged on each of the opposite surfaces of the plate 2312 (the upper and lower surfaces in FIG. 1B). Differently stated, the base portion 2311 and the rib 2313, both of which are projecting members, are found on each of the opposite surfaces of the elastic member 231. FIG. 1C shows an elastic member obtained by modifying the elastic member 231 of FIG. 1A, where the plate 2312 is arranged only in a minimum area located near the gate portion 2316, which will be described in greater detail hereinafter.

Figure 2:
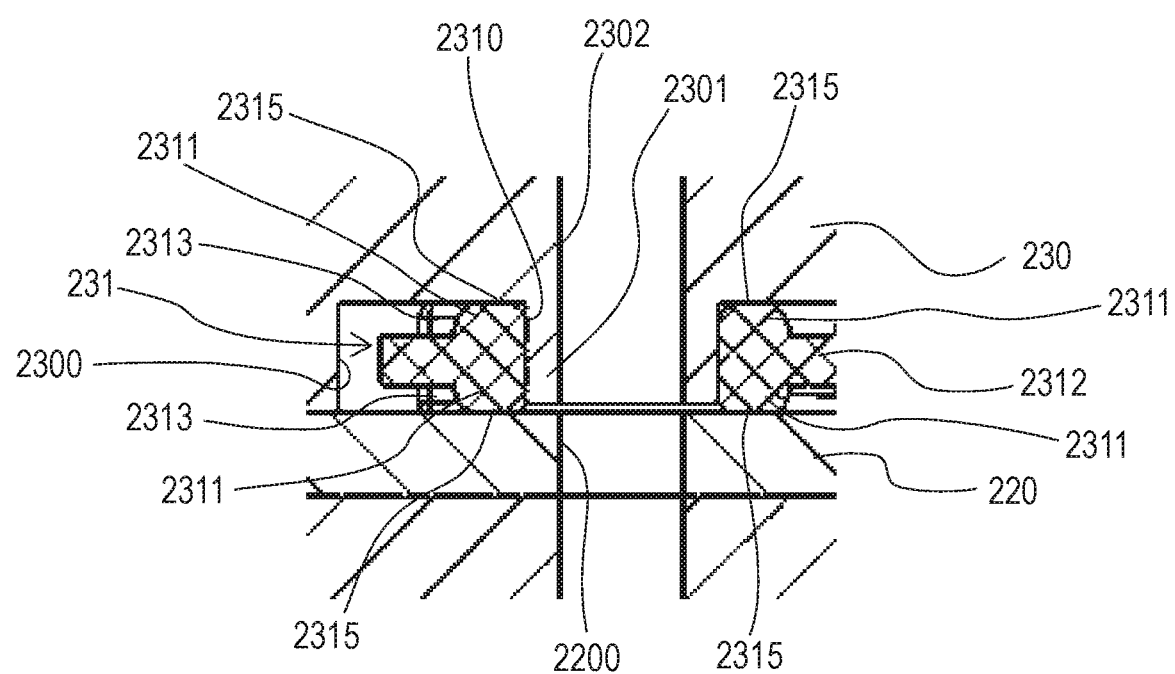
FIG. 2 is a schematic cross-sectional view of a sealing mechanism that includes a sealing member as illustrated in FIGS. 1A through 1C and a plurality of flow path forming members.

FIG. 2 shows the elastic member 231 in a state where it is connected to a plurality of (two in FIG. 2) flow path forming members. More specifically, FIG. 2 shows a sealing mechanism in which a plurality of flow path forming members (a negative pressure control unit 230 and a liquid supply unit 220) that form the flow path of liquid (e.g., liquid ink) in a liquid ejection apparatus are connected to each other by way of the elastic member 231. The sealing mechanism of this embodiment is applicable to various arrangements for joining flow path forming members for forming a flow path through which any of various fluids such as gases and liquids can flow. More specifically, the elastic member 231 is contained in a recess 2300 arranged in the negative pressure control unit 230 and a hollow cylindrical shaft 2301 (operating as a conduit for forming a flow path) that is arranged in the negative pressure control unit 230 is driven into (included in) the through hole 2310 of the elastic member 231. Then, the liquid supply unit 220 is brought into contact with the surface of the elastic member 231 that is located opposite to the surface thereof that is held in contact with the negative pressure control unit 230 and the opening (conduit portion) 2200 provided in the liquid supply unit 220 is made to positionally agree with the opening (conduit portion) 2302 of the shaft 2301 of the negative pressure control unit 230. With the above-described positional relationship, the negative pressure control unit 230 and the liquid supply unit 220 are brought closer to each other with the elastic member 231 disposed between them. Then, both the base portion 2311 of the elastic member 231 that is held in contact with the inner surface (sealing surface) of the recess 2300 of the negative pressure control unit and the base portion 2311 of the elastic member 231 that is held in contact with the surface (sealing surface) of the liquid supply unit 220 are elastically deformed and crushed at respective contact regions 2315. Then, as a result, the opening 2302 of the shaft 2301 of the negative pressure control unit 230 comes to communicate with the opening 2200 of the liquid supply unit 220 to produce a flow path. At the same time, the base portions 2311 that are elastically deformed and crushed at the respective contact regions 2315 seal the flow path formed by the opening 2302 of the shaft 2301 of the negative pressure control unit 230 and the opening 2200 of the liquid supply unit 220 relative to the outside. If the front end of the shaft 2301 of the negative pressure control unit 230 and the surface of the liquid supply unit 220 are not necessarily perfectly held in tight contact with each other as shown in FIG. 2, the sealing effect is established so long as the surrounding base portion 2311 of the elastic member is held in a compressed state. When the rib 2313 and the base portions 2311 have substantially the same height, the sealing effect is improved by the fact that they have the same height because the rib 2313 is also crushed just like the base portions 2311 when the elastic member 231 is pinched between the negative pressure control unit 230 and the liquid supply unit 220. Note that the shaft 2301 of the negative pressure control unit 230 may not necessarily project into the inside of the through hole 2310 of the elastic member but the through hole 2310 may alternatively be interposed between the opening 2302 of the negative pressure control unit 230 and the opening 2200 of the liquid supply unit 220. If such is the case, the through hole 2310 of the elastic member 231 operates as a part of the flow path.

(Effect of Sealing Member)

The elastic member 231 that is the sealing member of the above-described embodiment shows an excellent sealing effect and provides an advantage of minimizing the risk of fluid leakage. This will be described in greater detail below.

Figure 3:
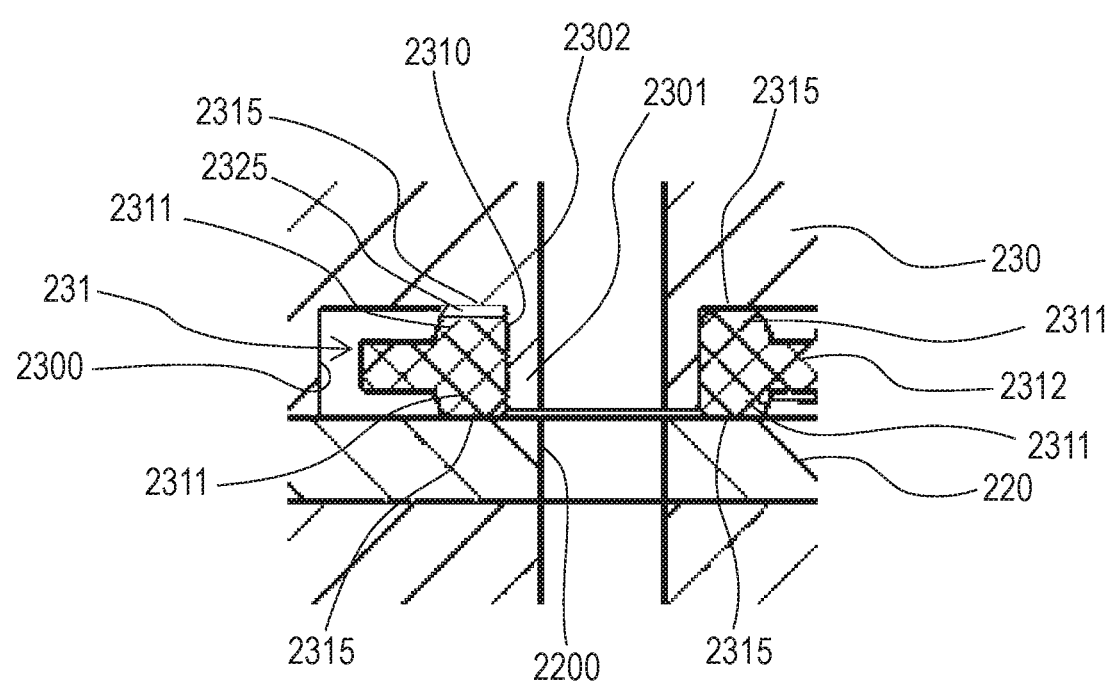
FIG. 3 is a schematic cross-sectional view of a known sealing mechanism that includes a sealing member and a plurality of flow path forming members.

If the above-described arrangement, where a plurality of flow path forming members (230 and 220) are joined together by way of the sealing member (elastic member 231), is accompanied by a problem of a poor sealing effect and hence of easily giving rise to a fluid leakage, the weld of the elastic member 231 can be one of the possible causes of the poor sealing effect. When the elastic member 231 is a resin molded product, a weld, which is a confluence of flows of a resin material, can be produced at the circumference of the opening (through hole 2310) of the elastic member 231. If the weld 2325 is in the shape of a deep groove (cut), the weld 2325 is left unclosed as seen in FIG. 3, even in a state where the base portions 2311 are pinched between the two flow path forming members 230 and 220 so as to become elastically deformed and crushed at the respective contact regions 2315. Then, there arises a possibility that fluid leaks to the outside by way of the weld 2325 that is left unclosed. If, to the contrary, no weld is produced at the base portions 2311, no route of fluid leakage is produced and hence no fluid is allowed to leak to the outside even when the base portions 2311 are elastically deformed and crushed at the respective contact regions 2315. If the weld 2325 formed at either of the base portions 2311 is a shallow one, the shallow weld 2325 is closed when the base portions 2311 are elastically deformed and crushed at the respective contact regions 2315. In either of the above-described instances, the base portions 2311 of the elastic member 231 provide an excellent sealing effect.

Since a rib 2313 is arranged at the elastic member 231 of this embodiment, no weld is formed at the base portion 2311 that is located around the through hole 2310 of the elastic member 231 or, if a weld 2325 is formed there, the formed weld 2325 will be very shallow. The reason for this will be described below. Note that, in the following description, the elastic member 231 is made to possess a plurality of (two) through holes 2310, a plurality of (two) base portions 2311 and a plurality of (two) ribs 2313. However, the underlying technical idea is also applicable to an instance where the elastic member 231 is made to possess a single through hole 2310, a single base portion 2311 and a single rib 2313.

Figure 4A:
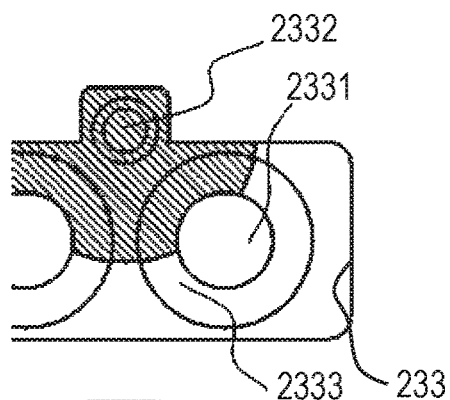
FIGS. 4A, 4B, 4C, 4D and 4E are schematic plan views of a known sealing member, schematically illustrating the sealing member molding steps of a known method of manufacturing a sealing mechanism.
Figure 4B:
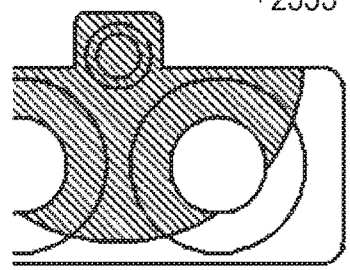
Figure 4C:
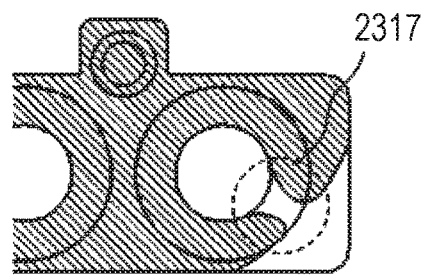
Figure 4D:
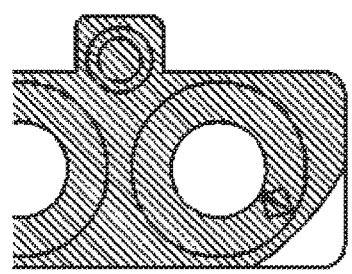
Figure 4E:
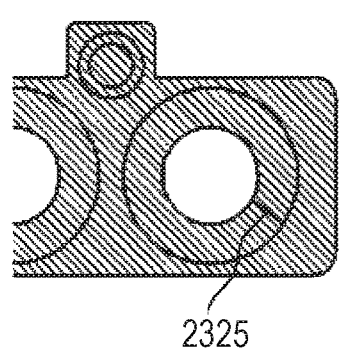
Figure 5A:
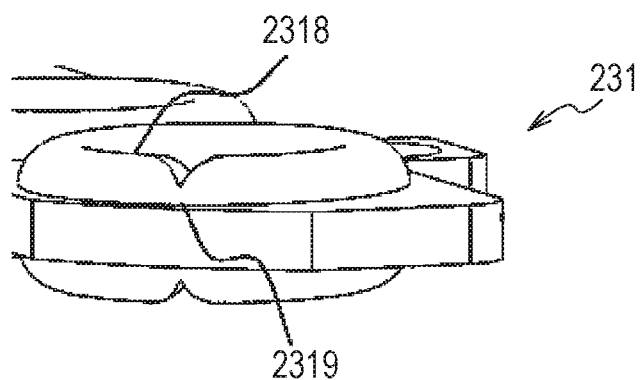
FIGS. 5A and 5B are schematic perspective views of a sealing member that is being molded by way of the molding steps as illustrated in FIGS. 4A through 4E.
Figure 5B:
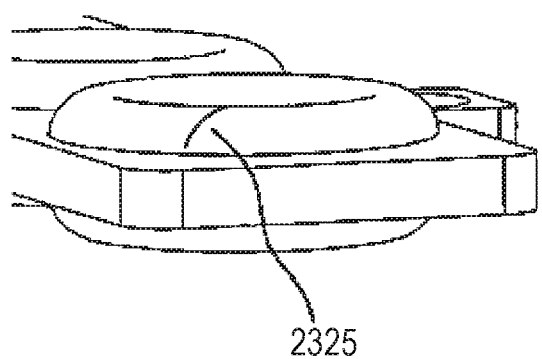

The elastic member 231 that takes an important role for achieving the sealing effect is a resin molded product that is typically produced by injection molding. Generally, a weld, which is a confluence of flows of a resin material, is inevitably formed around a through hole 2310. FIGS. 4A through 4E schematically illustrate flows of a resin material that arises when an elastic member having no rib 2313 is formed by injection molding. In FIGS. 4A through 4E, the resin material is indicated by oblique lines. A pair of pins 2331 for respectively forming through holes 2310 and a gate 2332 from which the resin material is to be injected are arranged in the cavity 233 of the metal mold for forming the elastic member 231. As the molten resin material is injected from the gate 2332, the resin material spreads in the cavity 233 as shown in FIG. 4A. With regard to each of the pins 2331, as the resin material gets to position where it contacts the pin 2331, the resin material spreads further along the outer periphery of the pin 2331 from the opposite sides of the pin 2331 as shown in FIG. 4B. As shown in FIGS. 4A through 4D, the flows of the resin material that flow along the pin 2331 from the opposite sides of the pin 2331 join together at the position located remotest from the gate 2332 (resin flows joining region 2317) as shown in FIGS. 4C and 4D. When the flows of the resin material join together, the gas that has been left in the cavity 233 is pushed particularly into the recess for forming a protrusion, or a recess for forming a protruded base portion 2311, (base portion-forming recess 2333). The flows of the resin material that are held in contact with the metal mold is slowed down and becomes slower than any flow of the resin material that is not held in contact with the metal mold due to the friction between the resin material and the metal mold. In other words, the part of the cavity that corresponds to the front end 2318 of the base portion 2311 will be filled latest. Therefore, as shown in FIG. 5A, if the flows of the resin material join together at the root end part 2319 of the base portion 2311, there arises a situation where the front end 2318 of the base portion 2311 is short of the resin material. Thus, if the operation of injecting the resin material is kept going as shown in FIG. 4E, the remaining gas is placed in the recess 2333 for forming the base portion (at the place of the recess that corresponds to the front end 2318 and its vicinity of the base portion 2311). Then, if the resin material that is held in contact with the metal mold is cooled and solidified in such a condition, a relatively deep weld 2325 that is attributable to the remaining gas is produced at the front end 2318 of the base portion 2311, which is a part that is held in contact with the metal mold, as shown in FIG. 5B.

Figure 1B:
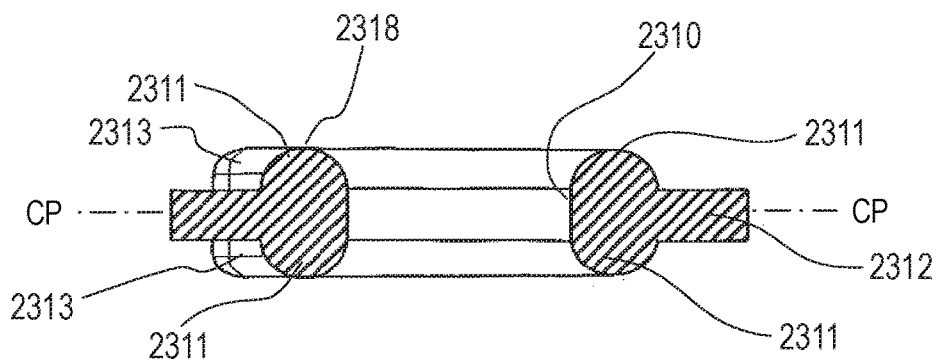
Figure 1C:
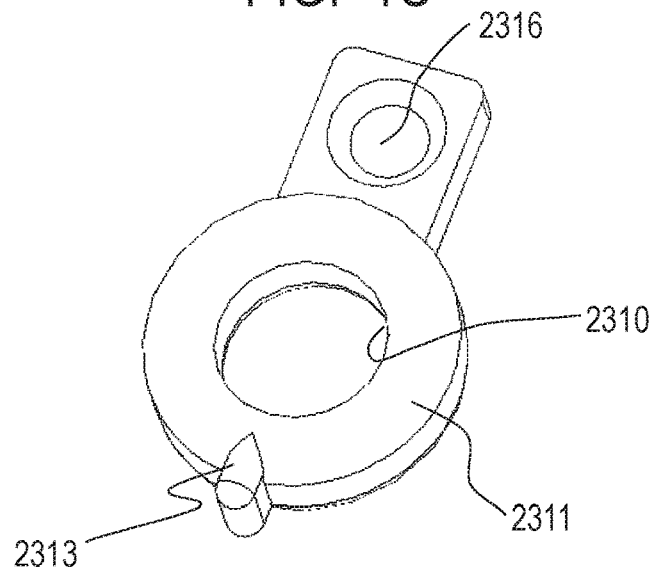

While the elastic member 231 shown in FIGS. 1A through 1C possesses only a single through hole 2310 particularly deep welds are apt to be produced when an elastic member 231 having a plurality of through holes 2310 is molded by injecting a resin material from gates 2332 whose number is smaller than the number of the through holes 2310. The reason for this is that the injected resin material can easily be cooled at and near the pins 2331 (through holes 2310) in areas located far away from any of the gates 2332 and hence pressure that is necessary for compressing the remaining gas can hardly be applied to the resin material located in such areas.

Figure 6A:
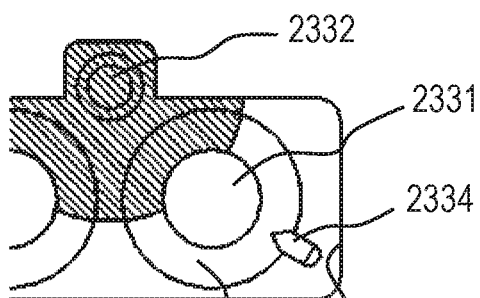
FIGS. 6A, 6B, 6C, 6D and 6E are schematic perspective views of a sealing member according to the present disclosure, schematically illustrating the sealing member molding steps of a method of manufacturing a sealing member according to the present disclosure.
Figure 6B:
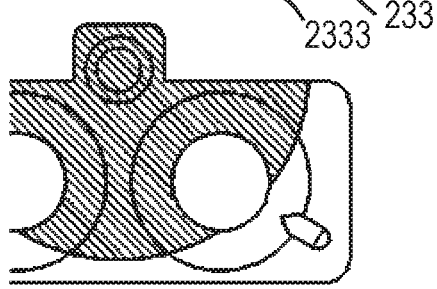
Figure 6C:
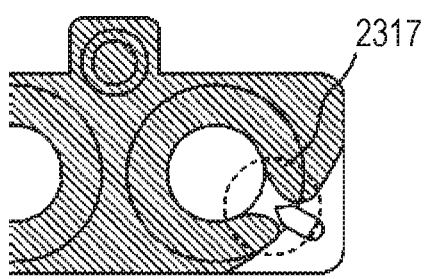
Figure 6D:
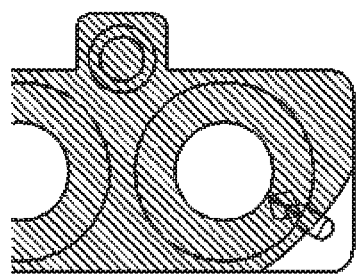
Figure 6E:
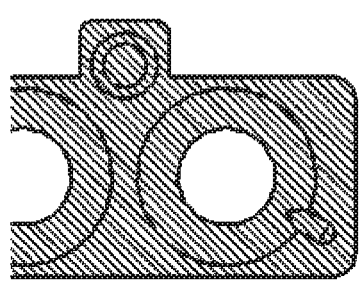
Figure 7A:
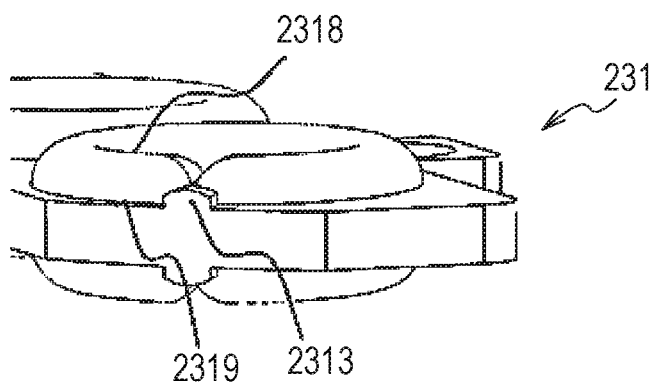
FIGS. 7A and 7B are schematic perspective views of a sealing member that is being molded by way of the molding steps as illustrated in FIGS. 6A through 6E.
Figure 7B:
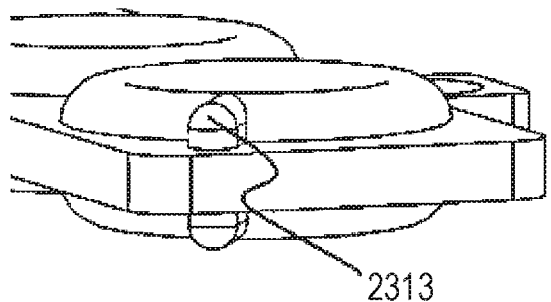

To the contrary, when manufacturing the elastic member 231 of this embodiment, a deep weld 2325 can hardly be formed at the base portion 2311. The reason for this will be described below by referring to FIGS. 6A through 6E and FIGS. 7A and 7B. When forming the elastic member 231 of this embodiment, as a molten resin material is injected from the gate 2332, the resin material spreads in the mold cavity 233 as shown FIG. 6A and then, with regard to the right side pin shown in FIGS. 6A through 6E, flows along the outer periphery of the pin 2331 from the opposite sides thereof as shown in FIG. 6B. The flows of the resin material that flows from the opposite sides of the pin 2331 join together at the periphery of the pin 2331 at the position located remotest from the gate 2332 (resin flows joining region 2317) as shown in FIG. 6C. Since the elastic member 231 of this embodiment has a rib 2313 located near the pin, a recess for forming the rib (rib-forming recess) 2334 is provided in the cavity 233. Preferably, the rib-forming recess 2334 is arranged at the position located remotest from the gate 2332 of the base portion-forming recess 2333. In other words, a part of the rib-forming recess 2334 is located in the resin flows joining region 2317. Additionally, the rib-forming recess 2334 extends in the normal direction that orthogonally intersects the outer edge of the base portion-forming recess 2333. As shown in FIG. 6D, when the flows of the resin material that run from the opposite sides of the pin 2331 join together at the resin flows joining region 2317, the gas remaining in the cavity 233 is pushed into the part of the recess 2333 for forming the base portion that is located in the resin flows joining region 2317. As shown in FIG. 7A, if the resin material is temporarily but sufficiently filled in the root end part 2319 of the base portion 2311, there arises a situation where the front end 2318 of the base portion 2311 is short of the resin material. However, as the resin material is injected further, the remaining gas is pushed out from the base portion-forming recess 2333 toward the rib-forming recess 2334 as shown in FIG. 6E. Then, as a result, gas is scarcely left in the base portion-forming recess 2333 and the base portion-forming recess 2333 is practically filled with the resin material. As the resin material is cooled and solidified in this state, no partial defect arises in the base portion 2311 and a weld 2325 is formed not at the base portion 2311 but at the rib 2313 as show in FIG. 7B. If, gas is left in the base portion-forming recess 2333 by chance, the amount of gas that is left there is only small and hence the depth of the weld 2325 that can be formed due to the remaining gas will be shallow.

As described above, a rib 2313 is provided so as to be connected to the outer edge of the base portion 2311 of the elastic member 231 of this embodiment. For the purpose of providing such a rib 2313, the cavity 233 for forming this elastic member 231 is provided with a rib-forming recess 2334, which is as a matter of course connected to the outer edge of the base portion-forming recess 2333. At the time of molding the elastic member 231, the rib-forming recess 2334 operates as gas discharge path and hence practically no gas is left in the base portion-forming recess 2333. Then, as a result, a weld 2325 is formed in the formed elastic member 231 not at the base portion 2311 but at the rib 2313 thereof. When the elastic member 231 is employed to seal the flow path of the liquid ejection apparatus, it will be clear that the weld 2325 is formed at the rib 2313 that is located at a position considerably separated from the flow path (the through holes 2310) and the base portion 2311 that is practically free from any defect is interposed between the flow path and the weld 2325. Then the flow path is sealed relative to the outside as the base portion 2311 is elastically deformed and crushed and there is no route (weld) that can give rise to fluid leakage existing in the base portion 2311. If a part of the weld 2325 is formed in the base portion 2311 by chance, the part of the weld formed in the base portion 2311 is shallow and hence that part of the weld 2325 is also closed when the base portion 2311 is elastically deformed and crushed. Thus, there arises no route that can give rise to fluid leakage in the base portion 2311. The weld 2325 is formed at the rib 2313 of the elastic member 2311. The surface of the rib 2313 may have a part that is not necessarily brought into contact with the inner surface of the cavity 233 so that there may arise an instance where the profile of the metal mold is not accurately transferred onto the rib 2313 and the rib 2313 shows a coarse surface. However, since the contact region 2315 of the base portion 2311 operates to seal the flow path, the profile of the rib 2313 that is located at a position considerably separated from the flow path and the weld 2325 formed at the rib 2313 do not adversely affect the sealing effect of the elastic member 231.

There can be instances where the elastic member 231 having a plurality of through holes 2310 is formed by injection molding of injecting a resin material from the gates 2332 and the number of the gates 2332 is smaller than the number of the through holes 2310, that is, the number of the pins 2331, that of the base portion-forming recesses 2333 and that of the rib-forming recesses 2334. If such is the case, welds 2325 are respectively formed mainly not at the contact regions 2315 of the base portions 2311 but at the ribs 2313 in this embodiment. Therefore, this embodiment can realize a sealing mechanism including an elastic member that provides an excellent sealing effect. Additionally, a plurality of through holes 2310 can be arranged so as to be surrounded by a single base portion 2311.

Note that a so-called pin-gate type injection molding technique is employed for the instances illustrated in FIGS. 4A through 4E and FIGS. 6A through 6E but a side-gate type injection molding technique, a submarine-gate type injection molding technique or some other injection molding technique may alternatively be employed. Additionally, the runner may be a cold runner or a hot runner. In short, there are no particular limitations to the above-listed aspects of injection molding technique for the purpose of the present disclosure.

If the longitudinal direction of the rib 2313 shows a too large angle relative to the direction that orthogonally intersects the tangent to the outer edge of the base portion 2311 (normal direction), the resin material can flow into the rib-forming recess 2334 from the base portion-forming recess 2333 too early. In other words, the resin material flows into the rib-forming recess 2334 before the base portion-forming recess 2333 (the part thereof that corresponds to the front end 2318 of the base portion 2311 in particular) is satisfactorily filled with the resin material and before the flows of the resin material joins together in the base portion-forming recess 2333. Then, for this reason, there can arise an instance where it is difficult to efficiently discharge the gas remaining in the cavity 233 from the base portion-forming recess 2333 into the rib-forming recess 2334. Differently stated, the gas can efficiently be discharged from the base portion-forming recess 2333 into the rib-forming recess 2334 by arranging the rib 2313 such that the longitudinal direction of the rib 2313 shows an angle within the range of ±45° relative to the normal direction of the base portion 2311. In other words, the angle formed between the longitudinal direction of the rib 2313 and the normal direction relative to the tangent to the outer edge of the base portion 2311 is preferably not more than 45°. Note that the rib 2313 is desirably so arranged that the weld 2325 is formed in the contact region of the elastic member 231 and the negative pressure control unit 230 or the liquid supply unit 220.

Figure 8A:
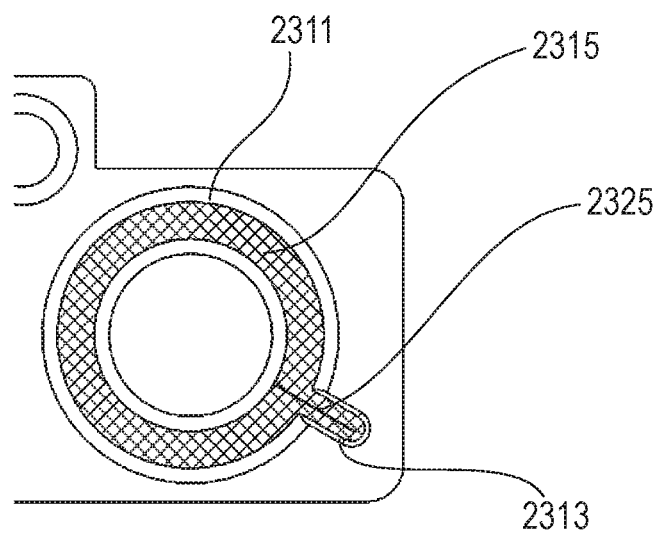
FIGS. 8A and 8B are schematic plan views of a sealing member in a state of being pinched by a plurality of flow path forming members.

FIG. 8A schematically illustrates the elastic member 231 in a state of being compressed between the negative pressure control unit 230 and the liquid supply unit 220 (see FIG. 2). The front end of the base portion 2311 is brought into contact with the negative pressure control unit 230 or the liquid supply unit 220 in the contact region 2315 and compressed. Similarly, the top of the rib 2313 of the elastic member 231 has a contact region that is continuously extending from the contact region 2315 of the base portion 2311 and held in contact with the negative pressure control unit 230 of the liquid supply unit 220. The top of the rib 2313 is compressed by the negative pressure control unit 230 and the liquid supply unit 220. The weld 2325 is formed so as to continuously extend from the front end of the base portion 2311 and the top of the rib 2313. On the other hand, with the arrangement illustrated in FIG. 8B, the position of the rib 2313 is shifted from the position shown in FIG. 8A and hence the weld 2325 is not located on the rib 2313. If compared with an instance where the weld 2325 is located only in the contact region 2315 of the base portion 2311 (FIG. 8B), the arrangement of FIG. 8A allows the length of the weld 2325 to be increased both at the front end of the base portion 2311 and at the top of the rib 2313. As the length of the weld 2325 is increased, the depth of the weld 2325 is decreased correspondingly so that the seal can be made more reliable.

Figure 8B:
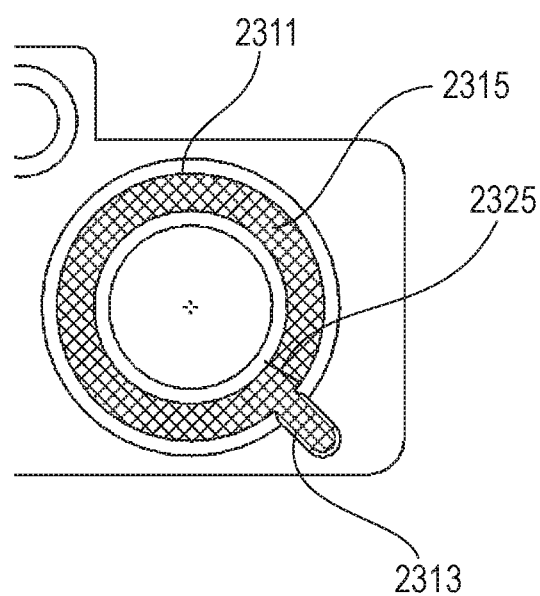
Figure 9A:
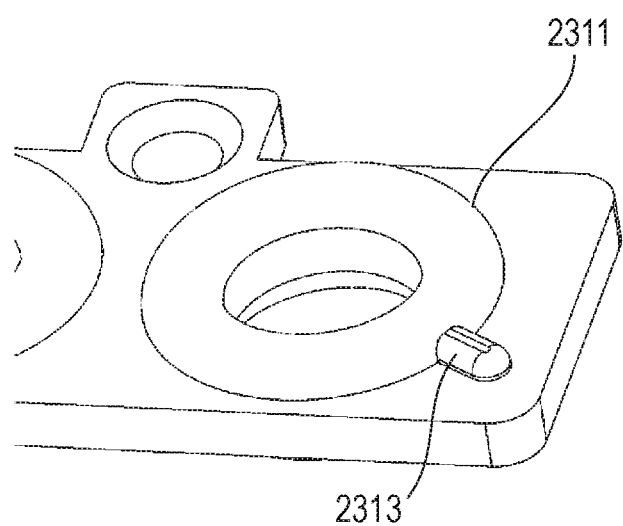
FIGS. 9A and 9B are a perspective view and a front view of a sealing member obtained by modifying the first embodiment of sealing member.
Figure 9B:
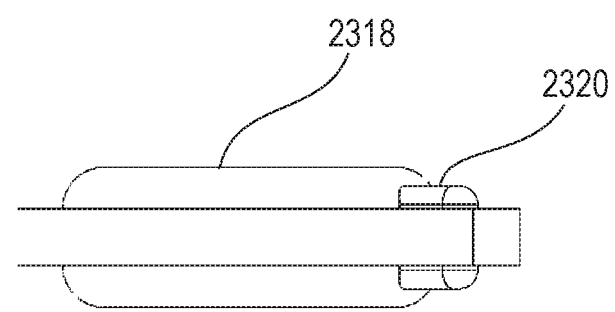

In the instances illustrated in FIGS. 8A and 8B, the height of the rib 2313 is made to agree with the height of the base portion 2311 so that, as a result, the contact region of the rib 2313 continuously extends from the contact region of the base portion 2311. When the front end 2320 of the rib 2313 (see FIG. 9B) and the front end 2318 of the base portion 2311 are made to be continuously connected to each other without producing any step at the boundary thereof, the gas remaining in the cavity can smoothly and efficiently be moved from the base portion-forming recess 2333 into the rib-forming recess 2334. Thus, such an arrangement is preferable from the viewpoint of suppressing the production of the weld 2325 and downsizing the produced weld 2325. Note, however, that the height of the rib 2313 may be made lower than the height of the base portion 2311 as shown in FIGS. 9A and 9B. With such an arrangement, a larger amount of gas can efficiently be driven to move from the base portion-forming recess 2333 into the rib-forming recess 2334 when the front end 2320 of the rib 2313 has a height close to that of the front end 2138 of the base portion 2311. In short, the height of the rib 2313 is preferably close to the height of the base portion 2311. Furthermore, the height of the rib 2313 may be made higher than the height of the base portion 2311, if the front end of the base portion 2311 is brought into contact with the surfaces to be sealed of the two flow path forming members 230 and 220 and compressed in a state where the rib 2313 is pinched between the two flow path forming members 230 and 220 and compressed.

Figure 10:
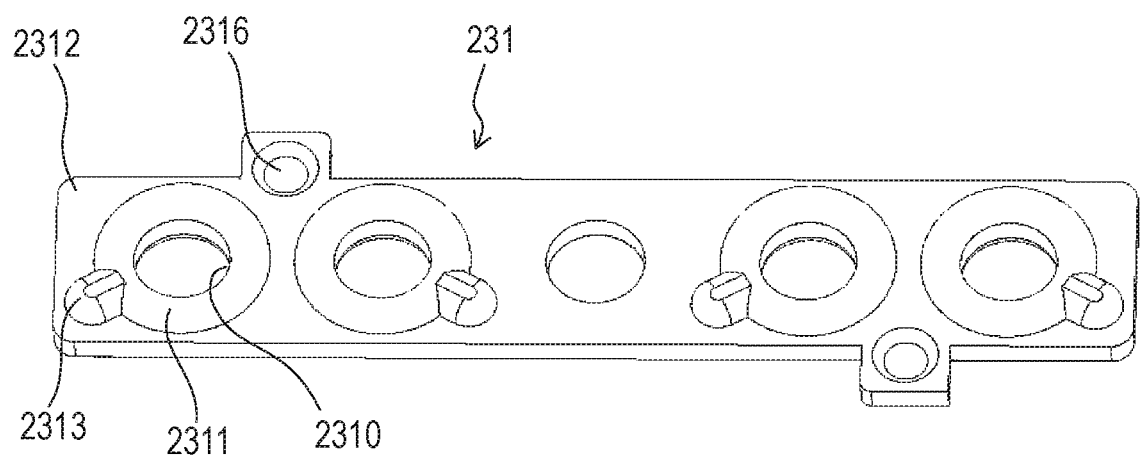
FIG. 10 is a schematic perspective view of another sealing member also obtained by modifying the first embodiment of sealing member.

Although the rib 2313 may be made to show a large width as illustrated in FIG. 10, the rib 2313 is preferably made to show a minimal width with which it can take the role required to it because a large width increases the force of reaction that the two flow path forming members 230 and 220 receive when the rib 2313 is pinched and crushed between the two flow path forming members 230 and 220. Note that, while FIG. 10 shows an arrangement where four through holes 2310, four base portions 2311 and four ribs 2313 are provided, the above statement about the width of the ribs equally applies to the arrangement where a single through hole 2310, a single base portion 2311 and a sing rib 2313 are provided or where the number of through holes 2310, that of base portions 2311 and that of ribs 2313 that are provided are plural but not four.

As described above, the flow path is produced as the elastic member 231 is pinched and crushed between two flow path forming members (negative pressure control unit 230 and liquid supply unit 220) in this embodiment. However, the elastic member 231 may be formed by two color molding either with the negative pressure control unit 230 or with the liquid supply unit 220. When they are formed by two color molding, the gas remaining in the base portion-forming recess 2333 is moved into the rib-forming recess 2334 at the time of molding the elastic member 231 because the rib-forming recess 2334 is arranged at the resin flows joining region 2317 in the base portion-forming recess 2333. Therefore, the appearance of the weld 2325 in the contact region 2315 of the base portion 2311 can be suppressed and a highly reliable flow path can be formed by means of the elastic member 231 that provides an excellent sealing effect.

The sealing member (elastic member) 231 may be so arranged that it is pinched and compressed between two flow path forming members (the negative pressure control unit 230 and the liquid supply unit 220), each of which is made of a materials different from the material of the sealing member 231. However, alternatively, the two flow path forming members 230 and 220 and the sealing member 231 may integrally be formed. In the latter instance, the sealing member may be formed by using a material that is not an elastic material but, preferably, the sealing member is formed by using a material of the kind same as the material of the two flow path forming members 230 and 220 that are joined with it. The members that are joined together are not limited to the above-listed three members and four or more members for constituting or sealing a flow path may integrally be formed.

(Configuration of Liquid Ejection Apparatus)

Figure 11:
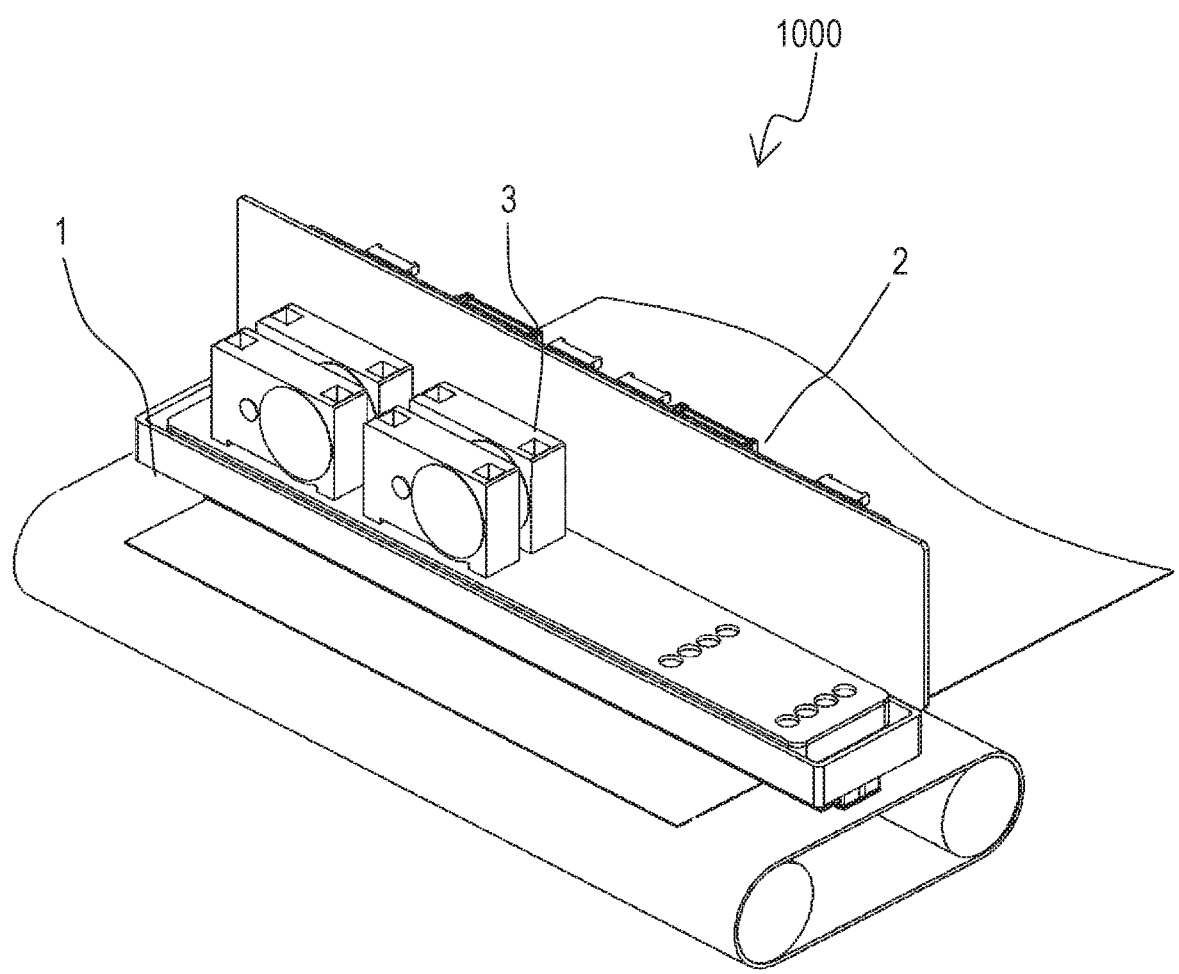
FIG. 11 is a schematic perspective view of an exemplar embodiment of liquid ejection apparatus that includes the sealing mechanism according to the present disclosure.
Figure 12:
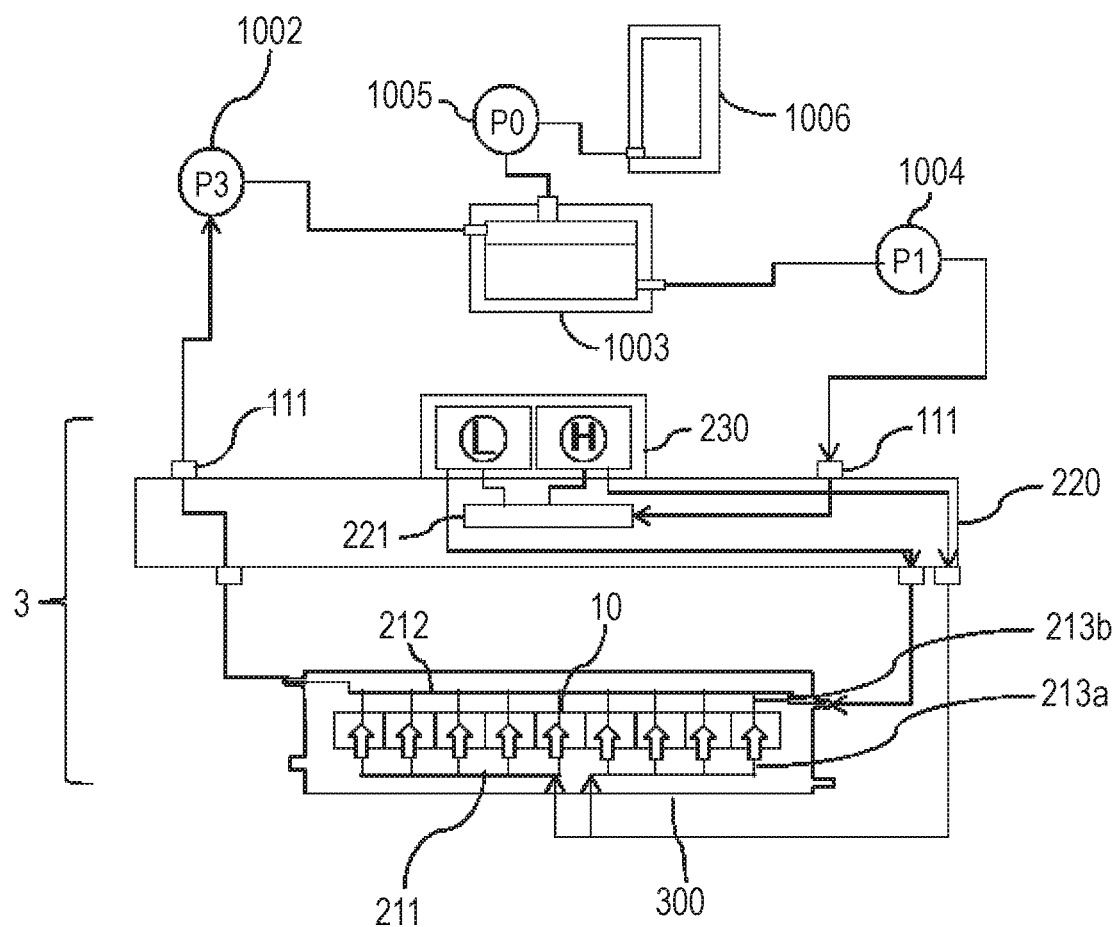
FIG. 12 is a schematic illustration of the liquid flow route of the liquid ejection apparatus shown in FIG. 11.

Now, an exemplar liquid ejection apparatus in which the sealing mechanism of this embodiment is to be incorporated will be described below by referring to FIG. 11. This liquid ejection apparatus is an ink jet recording apparatus 1000 (to be also referred to simply as "recording apparatus" hereinafter) designed to eject liquid ink for recording operations. The recording apparatus 1000 is a line type recording apparatus that includes a conveyance section 1 for conveying a recording medium 2 and a line type (page wide type) liquid ejection head 3 that extends substantially orthogonally relative to the conveyance direction of the recording medium. This recording apparatus 1000 operates for continuous recording with a single-pass method, while conveying a recording medium 2 continuously or intermittently. The recording medium 2 may be a sheet of paper supplied from a paper feed cassette or a paper roll. The liquid ejection head 3 can operate for full color printing, using liquid inks of a plurality of different colors (e.g., four colors of C: cyan, M: magenta, Y: yellow and K: black). As shown in FIG. 12, the liquid ejection head 3 is connected to a liquid supply means, which is a supply path for supplying liquid, a main tank 1006 and a buffer tank 1003 so as to allow liquid to flow through them. Additionally, the liquid ejection head 3 is electrically connected to an electrical control section for transmitting electric power and ejection control signals.

Now, the liquid flow route of the recording apparatus 1000 will be described below by referring to FIG. 12. In the recording apparatus 1000, the buffer tank 1003 is connected to the main tank 1006 that stores liquid ink by way of a replenishing pump 1005. A first circulator pump 1002 and a second circulator pump 1004 are connected to the buffer tank 1003. The buffer tank 1003 has an atmosphere communication port (not shown) that allows the inside and the outside of the tank to communicate with each other and hence can discharge the bubbles contained in the ink that is stored in the tank to the outside.

The second circulator pump 1004 that is connected to the buffer tank 1003 is also connected to liquid connecting section 111 of the liquid supply unit 220 of the liquid ejection head 3 and further to the negative pressure control unit 230 by way of filter 221. The negative pressure control unit 230 has two pressure regulation mechanisms, in which two mutually different control pressures can be set and which includes a control mechanism H, in which a relatively high pressure can be set for pressure control, and another control mechanism L, in which a relatively low pressure can be set for pressure control. The high pressure control mechanism H of the negative pressure control unit 230 is connected to common supply flow path 211 of the liquid ejection unit 300. The common supply flow path 211 is branched to a plurality of individual supply flow paths 213a in the inside of the liquid ejection head 300. Each of the individual supply flow paths 213a is connected a corresponding one of a plurality of individual collection flow paths 213b. The individual collection flow paths 213b join together to become a common collection flow path 212. In this embodiment, actually two common supply flow paths 211 are provided and a large number of individual supply flow paths 213a and a large number of recording element substrates 10 are divided into two groups. A number of individual supply flow paths 213a and a number of recording element substrates 10 form a group and are connected to one of the two common supply flow paths 211, while the remaining individual supply flow paths 213a and the remaining recording element substrates 10 form another group and are connected to the other common supply flow paths 211. However, all the individual supply flow paths 213a and all the recording element substrates 10 of the two groups are eventually connected to the single and same common collection flow path 212. On the other hand, the low pressure control mechanism L of the negative pressure control unit 230 is connected to the common collection flow path 212 of the liquid ejection unit 300. Thus, the low pressure control mechanism L of the negative pressure control unit 300 is connected to one of the opposite ends (the upstream side end) of the common collection flow path 212, where the plurality of individual collection flow paths 213b join together. The other end (the downstream side end) of the common collection flow path 212 is connected to another liquid connecting section 111 by way of the inside flow path of the liquid supply unit 220 and further to the buffer tank 1003 by way of the first circulator pump 1002. Therefore, a circulation route starting from the buffer tank 1003, connected to the liquid ejection unit 300 by way of the liquid supply unit 220 and the negative pressure control unit 230 and then returning to the buffer tank 1003 from the liquid ejection unit 300 by way of the liquid supply unit 200 is established. The main tank 1006 is connected to the circulation route. In this embodiment, two different supply routes are arranged in the liquid ejection unit 300. One of the supply routes starts from the high pressure control mechanism H of the negative pressure control unit 230 and gets to the common collection flow path 212 by way of the common supply flow paths 211, the plurality of individual supply flow paths 213a, the plurality of recording element substrates 10 and the plurality of individual collection flow paths 213b. The other supply route starts from the low pressure control mechanism L of the negative pressure control unit 230 and directly gets to the common collection flow path 212. There is only a single collection route starting from the liquid ejection unit 300 and gets to the liquid supply unit 220.

(Operation of liquid Ejection Apparatus)

Now, the operation of each of the constituent members of the above-described liquid routes will be described below. When ink is ejected (discharged) from the ejection ports (not shown) of the liquid ejection head 3 for recording, for recovery of suction power or some other purpose and consumed, the replenishing pump 1005 transfers ink from the main tank 1006 to the buffer tank 1003 to replenish ink for the buffer tank 1003 by the consumed amount of ink.

The first circulator pump 1002 takes the role of drawing out liquid from related one of the liquid connecting sections 111 of the liquid ejection head 3 and flows it to the buffer tank 1003. The first circulator pump 1002 is preferably a displacement type pump having a quantitative liquid feed capability. Specific examples of such pumps include tube pumps, gear pumps, diaphragm pumps and syringe pumps. Alternatively, however, a popular constant flow valve or a popular relief valve may be arranged at the pump outlet to secure a constant flow rate. With any of the above-described arrangements, when the liquid ejection unit 300 is driven to operate, ink is driven to flow through the common supply flow paths 211 and the common collection flow path 212 at a constant flow rate by the first circulator pump. More specifically, a relatively large ink flow rate is preferably preset so as to minimize the influence of the temperature difference among the recording element substrates 10 in the liquid ejection head 3 on the quality of the recorded image.

Note, however, if the ink flow rate shows a too large value, the negative pressure difference among the recording element substrates 10 becomes too large under the influence of the pressure loss at the flow paths in the liquid ejection unit 300 to give rise to uneven image density at the recorded image. In short, the ink flow rate is preferably determined by taking both the temperature difference and the negative pressure difference among the recording element substrates 10 into consideration.

The negative pressure control unit 230 is located between the second circulator pump 1004 and the liquid ejection unit 300 in the liquid route. If the ink flow rate of the circulating ink fluctuates due to some difference that may arise to the recording duty, the negative pressure control unit 230 exerts the function of operating as a valve for maintaining the pressure at the downstream side (namely at the side of the liquid ejection unit 300) of the negative pressure control unit 230 to a preset pressure level. The two pressure regulation mechanisms that the negative pressure control unit 230 includes may have any configuration so long as they can control the pressure at the downstream side thereof so as to confine it within a certain range that is centered at the desired preselected pressure level. As an example, a pressure regulation mechanism that operates like a so-called pressure reducing regulator may be adopted for each of them. When a pressure reducing regulator is employed, the upstream side of the negative pressure control unit 230 is pressurized by the second circulator pump by way of the liquid supply unit 220 as shown in FIG. 12. With such an arrangement, the influence of the water head pressure of the buffer tank 1003 relative to the liquid ejection head 3 can be suppressed to raise the degree of freedom of the layout of the buffer tank 1003 in the recording apparatus 1000.

Any pump can be used for the second circulator pump 1004 so long as it provides lift pressure not lower than a given pressure level within the flow rate range of circulating ink when the liquid ejection head 3 is driven to operate. For example, the second circulator pump 1004 may be a turbo type pump or a displacement type pump. More specifically, a diaphragm pump can be used for the second circulator pump 1004. Alternatively, the second circulator pump 1004 may be replaced by a water head tank that is arranged to show a given water head difference relative to the negative pressure control unit 230. As described above, the negative pressure control unit 230 has two pressure regulation mechanisms (including a high pressure control mechanism H and a low pressure control mechanism L), which are respectively connected to the common supply route 211 and the common collection route 212 in the liquid ejection unit 300 by way of the liquid supply unit 220.

With the liquid route (circulation route) of this embodiment, ink is supplied from the liquid connecting sections 111 of the liquid ejection head 3 to two positions in the center part and to a position at one of the opposite ends of the liquid ejection unit 300 by way of the liquid supply unit 220 and the negative pressure control unit 230. The ink supplied to the two positions in the center part of the liquid ejection unit 300 passes through the common supply flow paths 211, the individual supply flow paths 213a and the recording element substrates 10 and then is collected in the common collection flow path 212. On the other hand, the ink supplied to a position at one of the opposite ends of the liquid ejection unit 300 flows into the common collection flow path 212. At the common collection flow path 212, the ink coming from the two positions in the center part of the liquid ejection unit 300 by way of the common supply flow paths 211, the individual supply flow paths 213a and the recording element substrates 10 and the ink supplied to the one position at one of the opposite ends of the liquid ejection unit 300 join together so as to flow further. In this way, the ink that flows through the common collection flow path 212 is collected at the outside of the liquid ejection head 3 from the other end of the liquid ejection unit 300 by way of the related one of the liquid connecting sections 111 of the liquid supply unit 220.

The above-described two different supplies of ink are made possible by the fact that a pressure difference is produced between the pressure regulation mechanism H connected to the common supply flow paths 211 and the pressure regulation mechanism L connected to the common collection flow path 212 and the first circulator pump 1002 is connected only to the common collection flow path 212. As two different supply routes are formed in this way, while ink is being ejected from some of the ejection ports of the liquid ejection head 3, ink can be made to constantly flow through the ejection ports that are not ejecting ink and also through the pressure chambers. Then, as a result, the thickening of the ink viscosity, if any, at the ejection ports that are not operating for ink ejection and at the pressure chambers can be suppressed. Additionally, if there exist thickened ink and foreign objects contained in ink, such ink and foreign objects can be forced to flow into the common collection flow paths 212 and discharged therefrom by the flowing ink. Thus, the liquid ejection head 3 of this embodiment can operate for high image quality recording operations at high speed.

As the rate at which ink is ejected from the liquid ejection head 3 rises, the pressure loss of the ink flowing through the common supply flow paths 211, the recording element substrates 10 and the common collection flow path 212 increases to in turn reduce the ink pressure in the common supply flow paths 211. As the ink pressure in the common supply flow paths 211 falls below the set pressure level of the low pressure side control mechanism L, there arises a situation where ink flows only through the common collection flow path 212. Thus, as the rate at which ink is ejected from the liquid ejection head 3 rises, the flow of ink through the common supply flow paths 211, the individual recording element substrates 10 and the common collection flow path 212 is changed to a flow of ink only through the common collection flow path 212 so that any further increase of pressure loss can be suppressed.

While only the flow route of ink of a single color out of CMYK inks is described above and illustrated in FIG. 12, in reality, circulation routes of inks of four different colors are provided in the liquid ejection head 3 and also in the inkjet recording apparatus main body.

(Configuration of Liquid Ejection Head)

Figure 13:
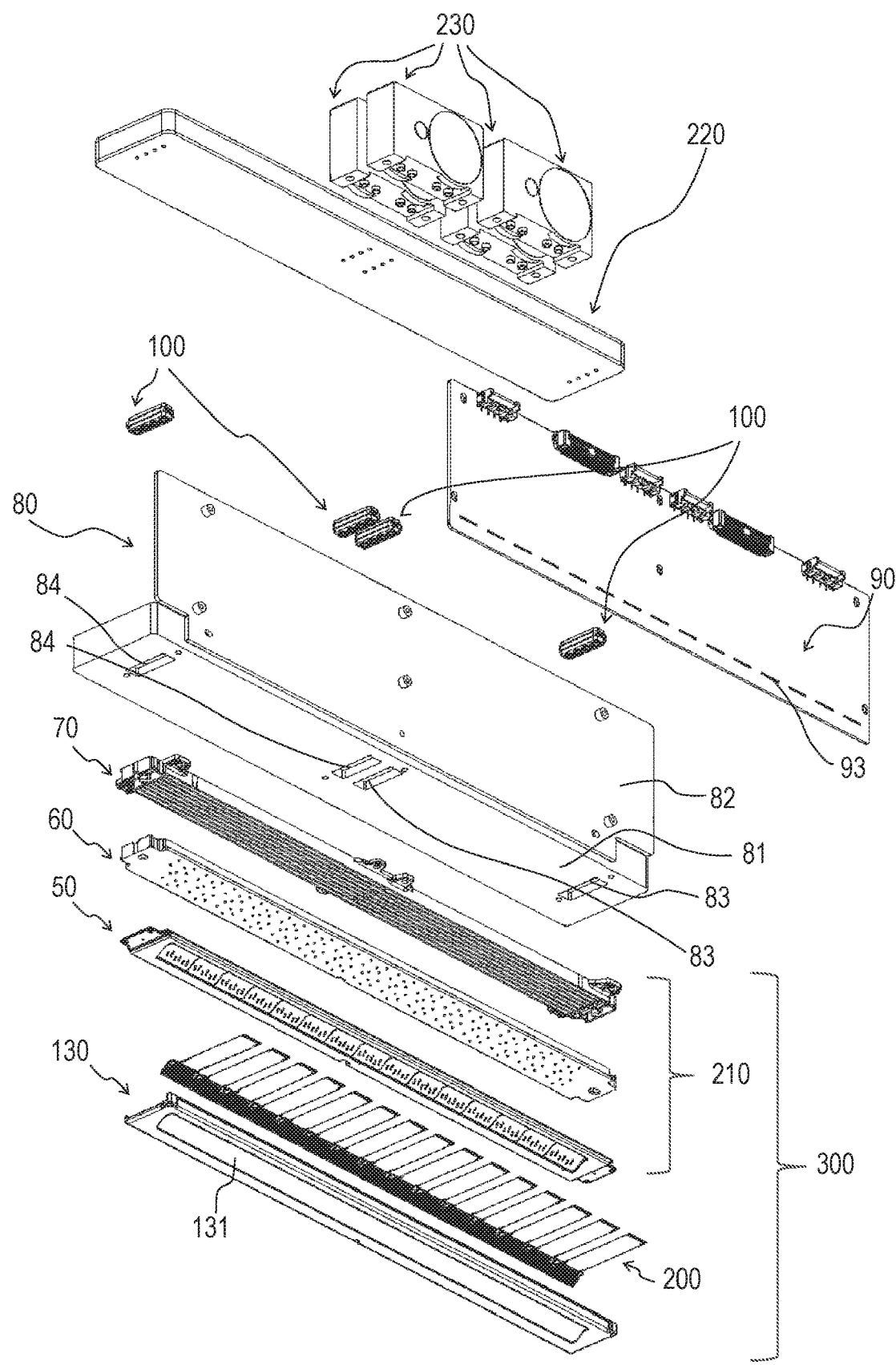
FIG. 13 is an exploded schematic perspective view of the liquid ejection head of the liquid ejection apparatus shown in FIG. 11.
Figure 14:
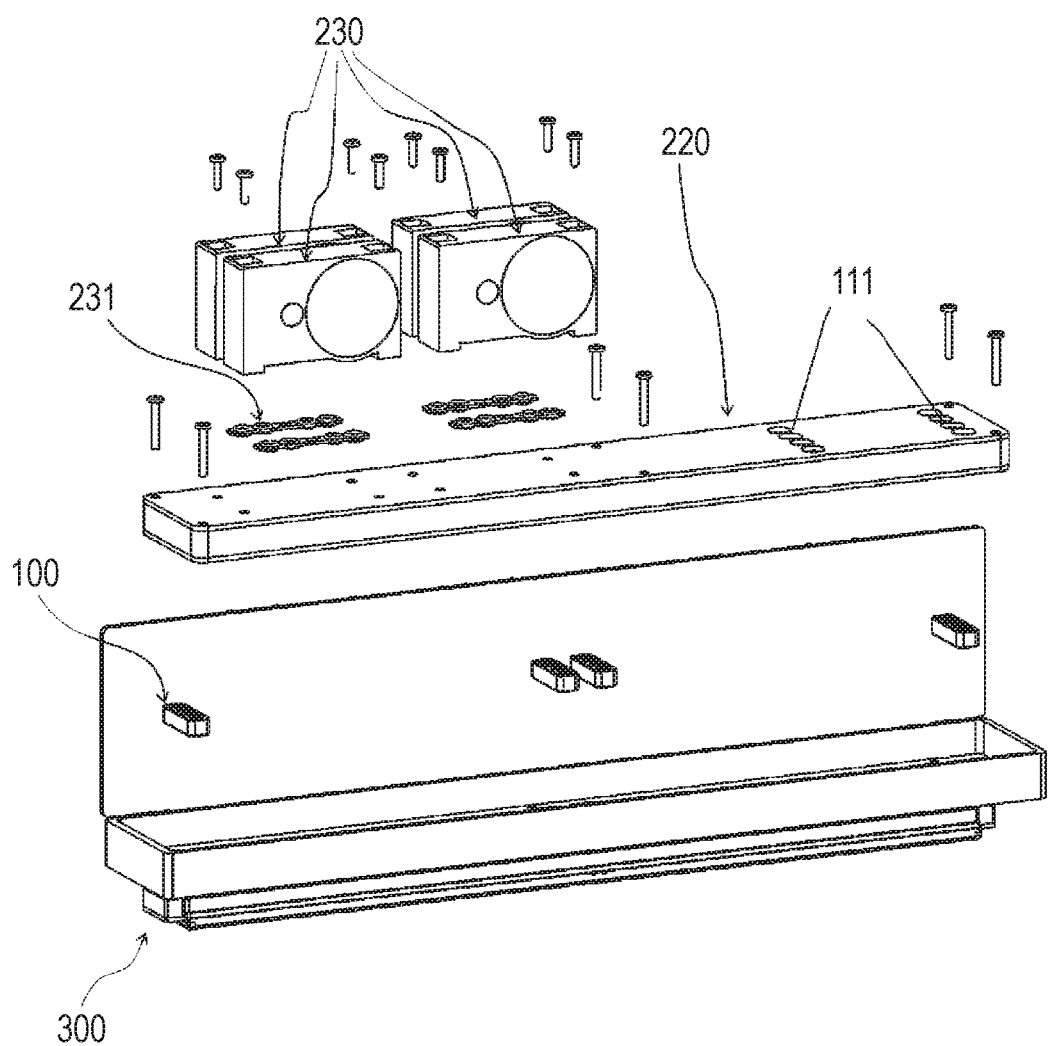
FIG. 14 is another exploded schematic perspective view of the liquid ejection head shown in FIG. 13 as viewed from a different angle.

FIGS. 13 and 14 are exploded schematic perspective views of the liquid ejection head 3 of a liquid ejection apparatus, illustrating the components or units thereof. Liquid connecting sections 111 (FIG. 12 and FIG. 14) are provided in the liquid supply unit 220 of the liquid ejection head 3. A filter 221 (FIG. 12) for removing the foreign objects contained in the supplied ink is arranged in the inside of the liquid supply unit 220 and held in communication with the openings of the liquid connecting sections 111 for each of the ink colors. The ink that passes through the filter 221 is then supplied to the negative pressure control unit 230 arranged on the liquid supply unit 220 of the corresponding ink color. The negative pressure control unit 230 is a unit that includes pressure regulation valves for each of the ink colors among others. The negative pressure control unit 230 remarkably reduces the fluctuations of the pressure loss in the inside of the supply route (the supply route at the upstream side of the liquid ejection head 3) of the recording apparatus 1000 that arises as a function of the fluctuations of the liquid flow rate by means of the operations of the valves, the spring members and other members of the unit that are arranged in the inside thereof. Then, as a result, the negative pressure control unit 230 can confine the fluctuations of the negative pressure within a given range and stabilize the negative pressure at the downstream side of itself (at the side of the liquid ejection unit 300). Two pressure control mechanisms (pressure regulation valves) are contained in the inside of the negative pressure control unit 230 for each of the ink colors as shown in FIG. 12. Of the two control mechanisms, the control mechanism with higher control pressure is held in communication with the common supply flow paths 211 in the liquid ejection unit 300 by way of the liquid supply unit 220, while the other control mechanism with lower control pressure is held in communication with the common collection flow path 212 also by way of the liquid supply unit 220.

The liquid supply unit 220 is fitted to one of the opposite surfaces of the liquid ejection head support section 81 (the upper side surface in FIGS. 13 and 14). The liquid ejection unit 300 is fitted to the other surface of the liquid ejection unit support section 81 (the lower side surface in FIGS. 13 and 14). Electrical wiring board support section 82 is rigidly secured to the liquid ejection unit support section 81 by means of screws. The liquid supply unit 220 is held in contact with one of the opposite surfaces (the inside facing surface) of the electrical wiring board support section 82 and the electrical wiring board 90 is fitted to the other surface (the outside facing surface) of the electrical wiring board support section 82.

As shown in FIG. 13, the liquid ejection unit 300 of this embodiment includes a flow path member 210 and a plurality of ejection modules 200 and a cover member 130 is fitted to the recording medium side surface of the liquid ejection unit 300. The flow path member 210 of the liquid ejection unit 300 is a laminate formed by sequentially laying the first flow path member 50, the second flow path member 60 and the third flow path member 70. The liquid ejection unit 300 is a flow path member for distributing the ink supplied from the liquid supply unit 220 to each of the ejection modules 200 and collecting the ink flowing back from the ejection modules 200 in order to return it to the liquid supply unit 220. The liquid ejection unit support section 81 is provided with openings 83, 84, 85 and 86 and the second elastic members 100 are driven into the respective openings 83 through 86. The liquid ejection unit 300 is laid on the surface of the liquid ejection unit support section 81 where the openings 83 to 86 are arranged and rigidly secured to the surface by means of screws.

Now, the liquid supply unit 220 that forms part of the liquid route of this embodiment and the negative pressure control unit 230 that operates as sub tank will be described below. As shown in FIG. 12, the liquid supply unit 220 and the negative pressure control unit 230 have respective flow paths in the inside and the flow paths are connected to the liquid ejection unit 300 to form the above-described circulation route. In this embodiment, the liquid supply unit 220 has an oblong, substantially rectangularly parallelepipedic profile, whose longitudinal length is substantially the same as that of the liquid ejection unit 300 (which is for example about 360 mm). Additionally, the liquid supply unit 200 is connected to the liquid ejection unit 300 by way of the second elastic members 100 at positions thereof located near the opposite ends and near the center as viewed in the longitudinal direction so as to allow liquid to flow between them. More specifically, although not shown, the openings of the third flow path member 70 of the liquid ejection unit 300 are respectively connected to the openings of the liquid supply unit 220 by way of the second elastic members 100.

The negative pressure control unit 230 has a relatively short longitudinal length (of about 70 mm) if compared with the longitudinal length of the liquid supply unit 220. A negative pressure control unit 230 is provided for each ink color. In the instance of a recording apparatus 100 designed to use four different color inks of CMYK, a total of four negative pressure control units 230 are provided. The negative pressure control units 230 are rigidly secured to the liquid supply unit 220 by means of screws and each of the negative pressure control units 230 and the liquid supply unit 220 are connected to each other by way of a first elastic member 231 so as to allow fluid to flow from either of them to the other. Thus, the first elastic members 231 provide reliable sealing between the negative pressure control units 230 and the liquid supply unit 220 as each of them is interposed between the corresponding one of the units 230 and the unit 220 and subjected to the compressive force generated by the fastening power of the screws so as to be tightly pressed against the sealing surfaces of the units 230 and the unit 222. Differently stated, as each of the first elastic members 231 is sandwiched between the sealing surface of the liquid supply unit 220 and the sealing surface of the corresponding one of the negative pressure control units 230 and compressed, liquid and gas trying to flow into the units 230 and 220 from the outside are blocked there. The first elastic members 231 correspond to the sealing members of the second embodiment, which will be described hereinafter. Additionally, the liquid supply unit 220 and the liquid ejection unit 300 are also rigidly secured to each other by means of screws with second elastic members 100 sandwiched between them. Thus, the second elastic members 100 provide reliable sealing between the liquid supply unit 220 and the liquid ejection unit 300 as they are interposed between the two units 230 and 220 and subjected to the compressive force generated by the fastening power of the screws so as to be tightly pressed against the sealing surfaces of the units 220 and 300.

Second Embodiment (Configuration of Sealing Member)

Figure 15A:
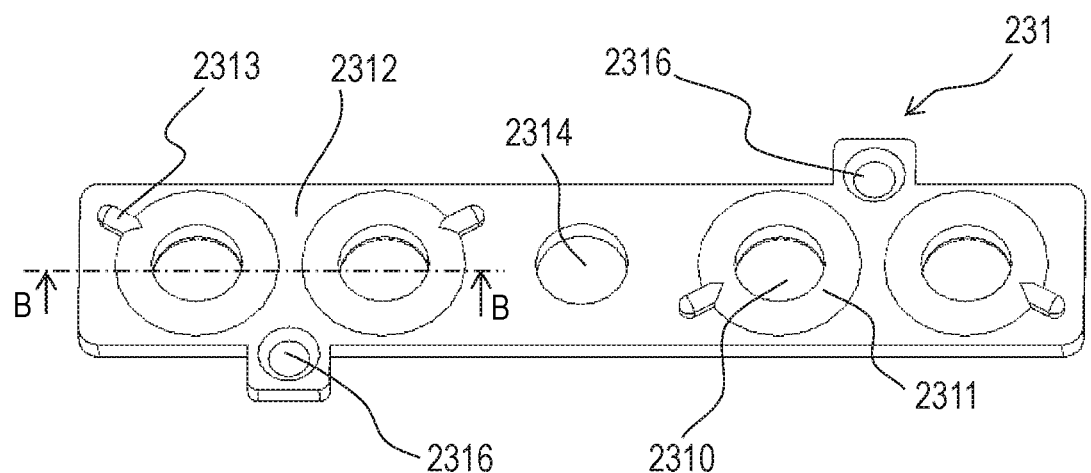
FIGS. 15A and 15B are a schematic perspective view and a schematic cross-sectional view of the second embodiment of sealing member.
Figure 15B:
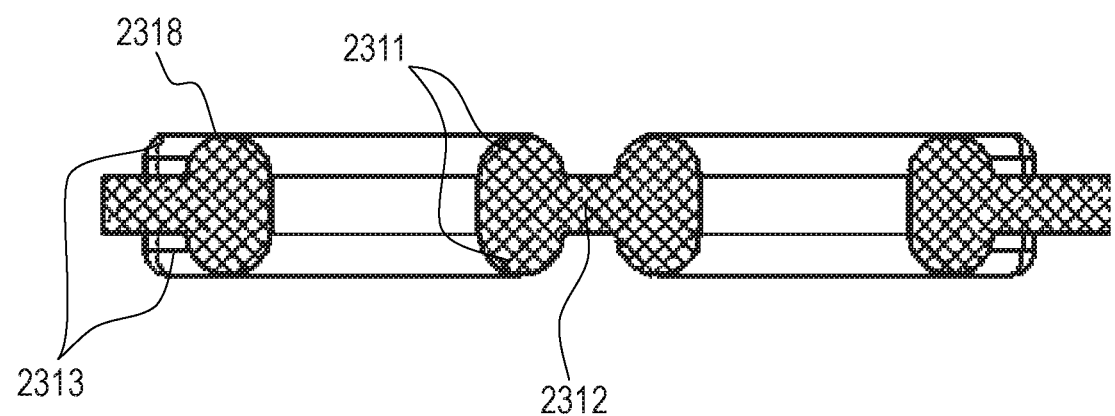

FIGS. 15A and 15B schematically illustrate a sealing member to be used in the second embodiment. This sealing member corresponds to one of the first elastic members 231 of the liquid ejection head 3 of the liquid ejection apparatus as shown in FIGS. 12 through 14. It is a flow path sealing member for sealing and binding one of the negative pressure control units 230 and the liquid supply unit 220, which are flow path forming members. The first elastic members 231 are resin molded products of an elastic material and preferably formed by injection molding of a thermoplastic elastomer. Considering the fluidity at the time of injection molding, the first elastic members 231 are preferably made of a resin material whose melt flow rate (MFR) is not higher than 50 g/10 min. Each of the negative pressure control units 230 and the liquid supply unit 220 is a product of a resin material formed by injection molding and preferably the resin material is polypropylene (PP), polyethylene (PE), polyphenylene ether and polystyrene (PPE+PS) or the like.

Each of the first elastic members 231 is a member formed by boring four through holes (openings) 2310 through a plate 2312 and arranging a base portion 2311, which is an annular protrusion, at the circumference of each of the through holes 2310. The plate 2312 operates as a link member for linking the base portions 2311. A rib 2313 is arranged at a part of the outer edge of each of the base portions 2311. As in the first embodiment, both the base portions 2311 and the ribs 2313 show a semicircular cross section and protrude from the opposite surfaces of the plate 2312. The front ends and their neighboring regions of each of the base portions 2311 operate as contact regions 2315 that are pressed respectively against and seal the negative pressure control unit 230 and the liquid supply unit 220. Like the arrangement illustrated in FIG. 2, each of the first elastic members 231 is sandwiched and compressed between one of the negative pressure control units 230 and the liquid supply unit 220. The contact regions 2315 at the front ends of each of the base portions are pressed respectively against the corresponding one of the negative pressure control units 230 and the liquid supply unit 220 to seal the related flow path.

A guide hole 2314 is bored through the plate 2312 at the center of the plate 2312. The guide hole 2314 operates as a rough guide when the corresponding one of the first elastic members 231 is assembled with the negative pressure control unit 230 and the liquid supply unit 220 by bringing the positioning pin (not shown) extending from the negative pressure control unit 230 into engagement with the guide hole 2314. The first elastic members 231 show a point symmetric profile relative to the guide hole 2314. The shafts 2301 that extend from the negative pressure control unit 230 are driven into the respective through holes 2310 of the first elastic member 231 so as to minimize the positional displacement, if any, of the flow paths that can take place between the negative pressure control unit 230 and the through holes 2310. Note, however, that the shafts 2301 may be replaced by a positioning structure arranged at the liquid supply unit side or some other positioning arrangement whose positioning effect takes place at positions other than the through holes 2310.

At the time of forming the first elastic member 231 of this embodiment, the resin material injected from the gate 2332 flows along the outer periphery of the pin 2331 from the opposite sides of the pin 2331 and the flows of the resin material joins at the position located remotest from the gate 2332 (the resin flows joining region 2317) as in the instance of the first embodiment described earlier by referring to FIGS. 6A through 6E. At this time, the gas remaining in the cavity 233 is forced to move from the base portion-forming recess 2333 into the rib-forming recess 2334 in the resin flows joining region 2317. Thus, no gas is left in the base portion-forming recess 2333 and the base portion-forming recess 2333 is practically filled with the resin material. Then, as a result, a weld is formed at the rib 2313 but no weld 2325 is formed at the base portion 2311 or, if a weld 2325 is formed at the base portion 2311, only a shallow weld 2325 is formed there. The contact region 2315 at the front end of the base portion 2311 is pressed against and seals the sealing surface of the negative pressure control unit 230 and the sealing surface of the liquid supply unit 220. Therefore, because no weld 2325 is formed or, if a weld 2325 is formed, only a shallow weld 2325 which can be closed only when pressed, is formed at the base portion 2311, there arises no risk for fluid to flow through the weld so that an excellent sealing effect is provided there.

Only the base portions 2311 and the ribs 2313 that are arranged near one of the through holes 2310 of the first elastic member 231 of the embodiment illustrated in FIGS. 15A and 15B are described above. However, the above description equally applies to the base portions 2311 and the ribs 2313 arranged near each of the remaining three through holes 2310. While each of the first elastic members of the first embodiment illustrated in FIGS. 1A through 1C has a single through hole 2310 and a single base portion 2311 and each of the first elastic members of this embodiment illustrated in FIGS. 15A and 15B has four through holes 2310 and four base portions 2311, the number of through holes 2310 and that of base portions 2311 are not limited to the above described ones and may alternatively be two, three, five or more. In any case, at least a rib 2313 is arranged for each base portion 2311.

Figure 16A:
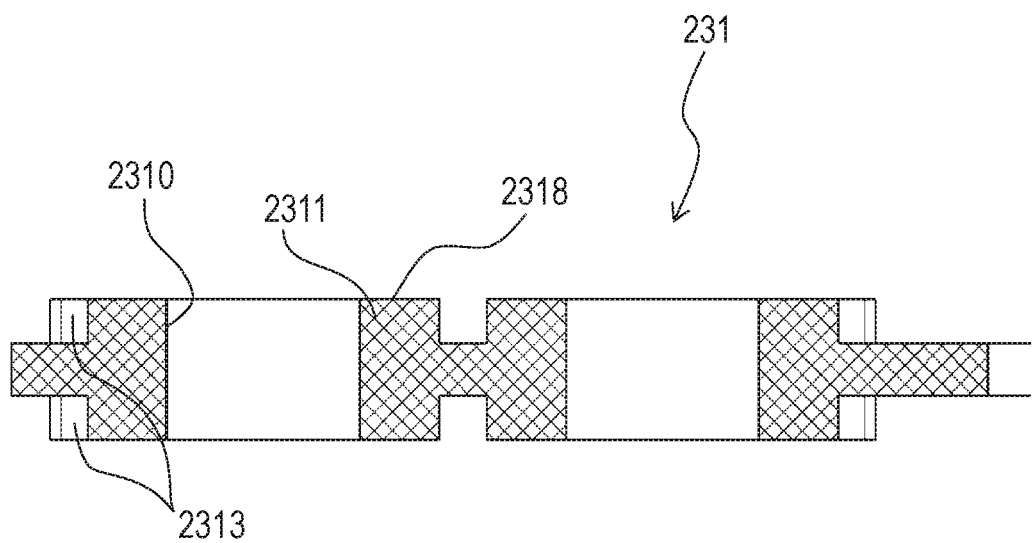
FIGS. 16A and 16B are schematic cross-sectional views of a sealing member obtained by modifying the second embodiment of sealing member.
Figure 16B:
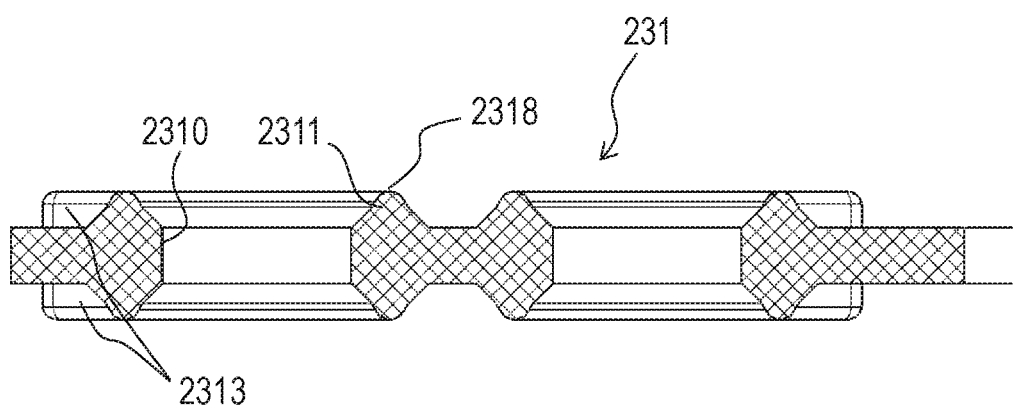

Each of the base portions 2311, which is an annular protrusion, may alternatively show a rectangular cross section as illustrated in FIG. 16A. However, when each of the base portions 2311 is tapered toward the front end as shown in FIG. 15B and FIG. 16B, the capacity of the cavity 233 that corresponds to the front end 2318 of the base portion 2311 can be reduced to further reduce the gas remaining there and the weld can be made shallower. Each of the ribs 2313 may also be made to show a cross section that is tapered toward the front end.

Third Embodiment (Configuration of Sealing Mechanism)

Figure 17:
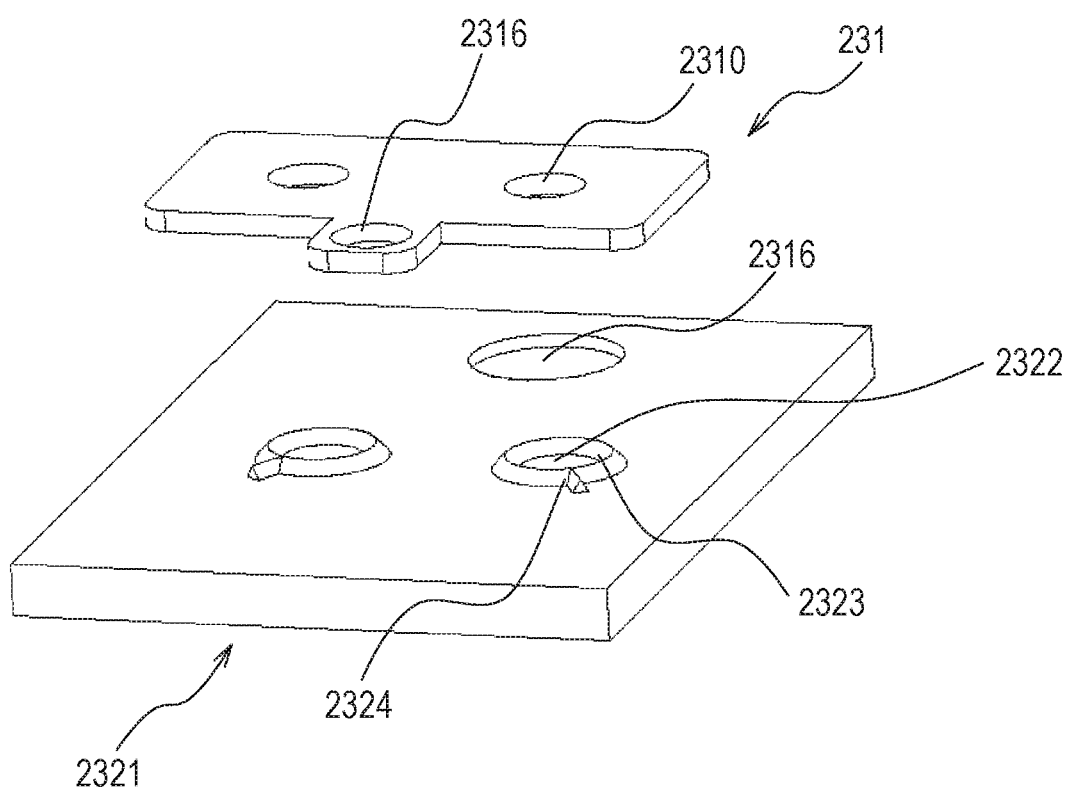
FIG. 17 is a schematic perspective view of a principal part of the third embodiment of sealing mechanism.

In the above-described first and second embodiments, each of the sealing members (the first elastic members 231) is provided with one or more base portions 2311. The base portion 2311 or each of the base portions 2311 is an annular protrusion showing a protruding cross section. On the other hand, as shown in FIG. 17, each of the sealing members 231 may alternatively be a flat plate-like member and the flow path forming members connected to it may be provided with one or more base portions that is an annular protrusion or annular protrusions. With such an arrangement, each of the sealing members 231 is provided with a gate portion (a portion oppositely disposed relative to the gate 2332 of the injection molding machine) 2316, which is the starting position of the resin-filling operation, and through holes 2310. Thus, the sealing members 231 do not have any protrusion and show a flat plate-like profile. Each of the openings (through holes 2322) constituting part of the flow paths of the flow path forming members 2321 that pinch the sealing member 231 between them is provided along the circumference thereof with an annular protrusion (base portion) 2323. The flow path forming members 2321 are resin molded products and each of the annular protrusions 2323 (base portions) is provided with a rib 2324 in a region where the flows of resin that flow down from the gate portion 2316 join together at the time of injection molding. The rib 2324 is connected to the outer edge of the base portion 2323. With the above described arrangement, the cavity for molding a flow path forming member 2321 is provided with base portion-forming recesses and rib-forming recesses, although not shown. Thus, the gas left in the cavity is forced to move from each of the base portion-forming recesses to the corresponding one of the rib-forming recesses at the time of filling the cavity with resin. Therefore, no weld is formed or, if a weld is formed, only a shallow weld is formed at each of the base portions 2323 arranged around the periphery of the corresponding one of the through holes 2322 of the flow path forming member 2321. Then, as a result, the risk that the fluid flowing through the through hole 2322 leaks through the weld is minimized and a high sealing effect is achieved. While a weld is formed at each of the ribs 2324, the ribs 2324 are located at respective positions that are separated from the through holes 2322 so that the risk of causing fluid to leak therethrough is very low.

Fourth Embodiment

Embodiments of the present disclosure where it relates to a sealing member or a flow path member to be used in a liquid ejection head are described above. However, the present disclosure equally relates to flow path sealing members employed at various different positions in recording apparatus, sealing members of valves and diaphragms, ink tanks mounted in recording apparatus and so on.
(Configuration of Sealing Mechanism)

Figure 18:
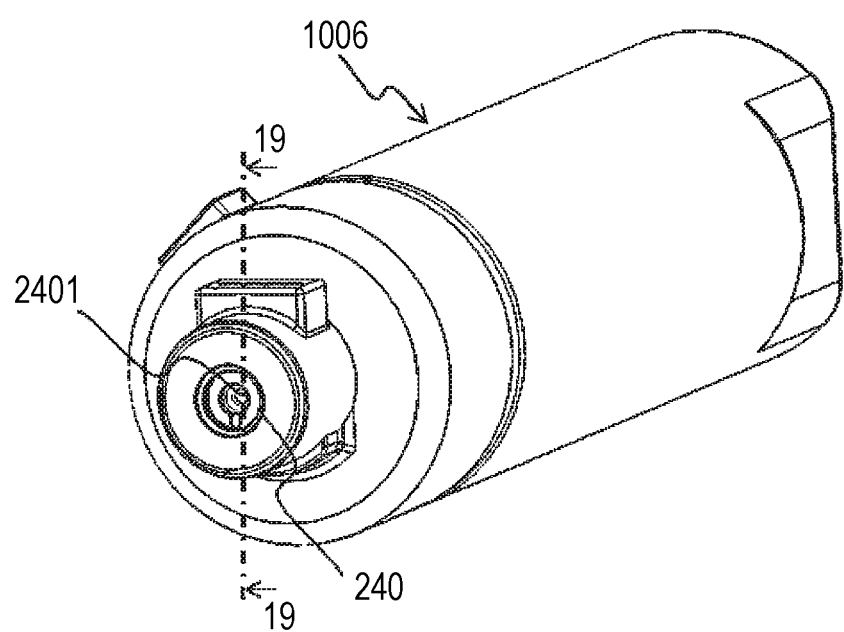
FIG. 18 is a schematic perspective view of a tank that includes the fourth embodiment of sealing mechanism.
Figure 19:
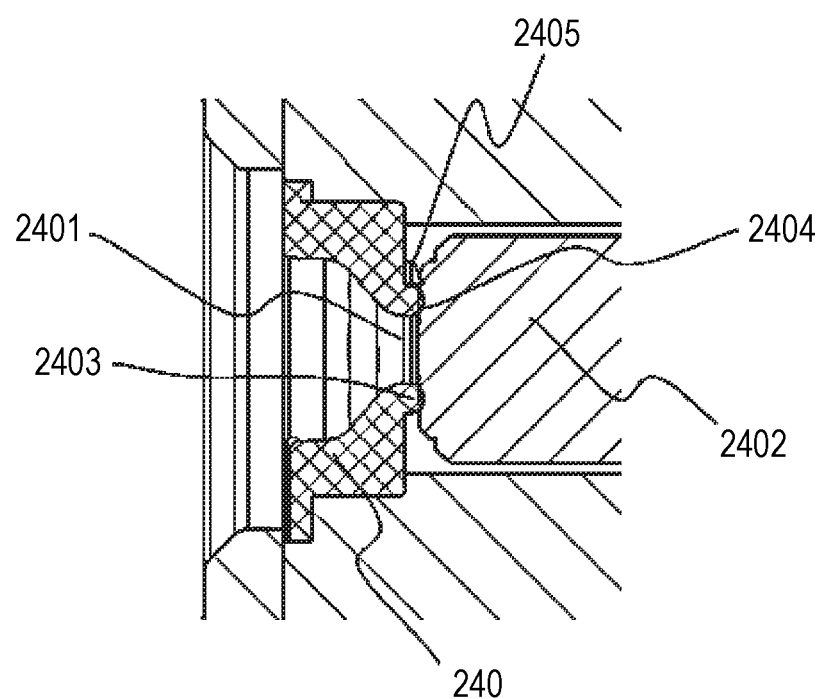
FIG. 19 is a schematic cross-sectional view taken along line 19-19 in FIG. 18.
Figure 20A:
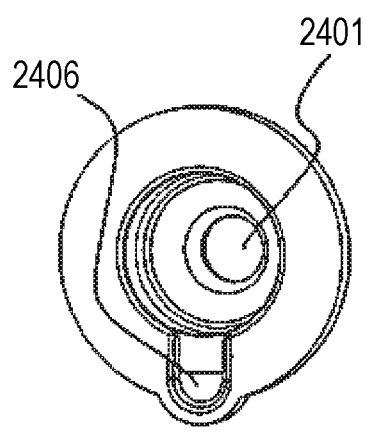
FIGS. 20A and 20B are schematic perspective views of the sealing mechanism illustrated in FIGS. 18 and 19.
Figure 20B:
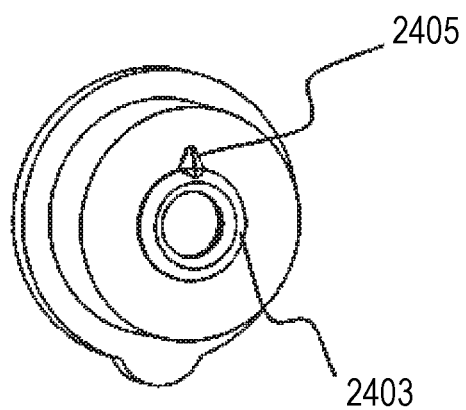

FIG. 18 is a schematic perspective view of an ink tank 1006 where this embodiment of sealing mechanism is adopted. The ink tank 1006 has a sealing member 240 arranged at a hole (opening 2401). An ink receiving pipe (not shown) arranged at the recording apparatus main body is connected to the opening 2401 and the ink contained in the ink tank 1006 is supplied to the flow path in the recording apparatus main body after passing through the ink receiving pipe. The sealing member 240 is a resin molded product and includes an annular protrusion (base portion) 2403 and a rib 2405 connected to the outer edge of the protrusion 2403 as shown in FIGS. 19 and 20B. The rib 2405 is located at the position that faces gate portion 2406 with the opening 2401 interposed between them and that agrees with the confluence where the resin flows join together in the injection molding operation for forming the sealing member 240. The contact region 2404 located at the front end of the annular protrusion 2403 of the sealing member 240 is brought into contact with supply port valve 2402. As the supply port valve 2402 is urged to press the sealing member 240 by means of a spring (not shown), the protrusion 2403 of the sealing member 240 is compressed to seal the contact region. As the ink receiving pipe is inserted into the supply port valve 2402, the supply port valve 2402 is pushed by the ink receiving pipe to allow the inside of the ink tank and the flow path in the recording apparatus main body to communicate with each other. This arrangement provides effects (a high sealing effect above all) similar to those of the present disclosure as described earlier.

Thus, the present disclosure provides a sealing mechanism that provides a high sealing effect at a sealing area where a plurality of members are joined together and sealed to suppress any possible leakage of fluid including gas and liquid that is attributable to a weld and also a liquid ejection apparatus incorporating such a sealing mechanism.

While the present disclosure has been described with reference to exemplary embodiments, it is to be understood that an invention or inventions involved in the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-231914, filed Dec. 1, 2017, which is hereby incorporated by reference herein in its entirety.

What is claimed is:

1. A sealing member, being a resin molded product, to be joined to a flow path forming member for forming a flow path through which a fluid flows, the sealing member having a surface comprising:
   an opening constituting or including a portion of the flow path;
   a protrusion surrounding the circumference of the opening; and
   a rib having one of its opposite ends connected to a part of the protrusion and the other end located inside or outside of the protrusion,
   the protrusion having at the top thereof a contact region to be pressed against and held in contact with the flow path forming member,
   wherein the rib is located oppositely to a gate portion from which a resin material was supplied at the time of molding the sealing member with reference to the opening interposed between the rib and the gate portion.

2. A sealing mechanism comprising:
   a plurality of flow path forming members joined together and forming a flow path through which a fluid flows; and
   a sealing member joined to the flow path forming members,
   at least one or more than one of the flow path forming members and the sealing member being a resin molded product having a surface comprising:
   an opening constituting or including a portion of the flow path;
   a protrusion surrounding the circumference of the opening; and
   a rib having one of its opposite ends connected to a part of the protrusion and the other end located inside or outside of the protrusion,
   the protrusion having at the top thereof a contact region pressed against and held in contact with a counterpart member joined to the member that is at least one or more than one of the flow path forming members and the sealing member,
   wherein the rib is located oppositely to a gate portion from which a resin material was supplied at the time of molding the sealing member with reference to the opening interposed between the rib and the gate portion.

3. The sealing mechanism according to claim 2, wherein a weld is formed on at least a part of the rib.

4. The sealing member according to claim 2, wherein at least a part of the top of the rib is a contact region pressed against and held in contact with the counterpart member.

5. The sealing mechanism according to claim 4, wherein a weld is formed in the contact region of the rib.

6. The sealing mechanism according to claim 2, wherein the height of the protrusion agrees with the height of the rib.

7. The sealing mechanism according to claim 2, wherein the top of the protrusion shows a tapered cross-sectional shape.

8. The sealing mechanism according to claim 2, wherein the top of the rib shows a tapered cross-sectional shape.

9. The sealing mechanism according to claim 2, wherein the member that is at least one or more than one of the flow path forming members and the sealing member has a surface provided with a plurality of sets each comprising the opening, the protrusion and the rib.

10. The sealing mechanism according to claim 2, wherein each of the flow path forming members and the sealing member is a resin molded product.

11. The sealing mechanism according to claim 2, wherein the member that is at least one or more than one of the flow path forming members and the sealing member is made of an elastomer.

12. The sealing mechanism according to claim 11, wherein the sealing member is sandwiched between and compressed by two of the flow path forming members that are made of a material different from the material of which the sealing member is made.

13. The sealing mechanism according to claim 2, wherein the protrusion and the rib are arranged on each of the opposite surfaces of the sealing member.

14. A method of manufacturing a sealing mechanism including a plurality of flow path forming members joined together and forming a flow path through which a fluid flows and a sealing member joined to the flow path forming members, the method comprising molding at least one or more than one of the flow path forming members and the sealing member by injecting a resin material into a cavity, wherein at the time of injecting the resin material:
   an opening constituting or including a portion of the flow path is formed by means of a pin arranged in the cavity;
   a protrusion surrounding the circumference of the opening is formed by means of a recess for forming a protrusion arranged around the pin;
   a rib having one of its opposite ends connected to a part of the protrusion and the other end located inside or outside of the protrusion is formed by means of a recess for forming a rib, the recess for forming a rib being connected to the recess for forming a protrusion; and
   gas remaining in the cavity moves from the recess for forming a protrusion to the recess for forming a rib as the recess for forming a protrusion is filled with the resin material injected into the cavity.

15. The method according to claim 14, wherein a weld is formed on the rib as the gas moves into the recess for forming a rib.

16. The method according to claim 14, wherein the cavity is provided with a plurality of sets, each comprising the pin, the recess for forming a protrusion and the recess for forming a rib, whereby the member that is at least one or more than one of the flow path forming members and the sealing member is molded such that it has a surface provided with a plurality of sets, each comprising the opening, the protrusion and the rib.

17. A sealing mechanism comprising:
a plurality of flow path forming members joined together and forming a flow path through which a fluid flows; and
a sealing member joined to the flow path forming members,
at least one or more than one of the flow path forming members and the sealing member being a resin molded product having a surface comprising:
an opening constituting or including a portion of the flow path;
a protrusion surrounding the circumference of the opening; and
a rib having one of its opposite ends connected to a part of the protrusion and the other end located inside or outside of the protrusion,
the protrusion having at the top thereof a contact region pressed against and held in contact with a counterpart member joined to the member that is at least one or more than one of the flow path forming members and the sealing member,
wherein the longitudinal direction of the rib forms an angle of not more than 45° relative to the normal direction to the tangent to the outer edge of the protrusion.

18. A sealing mechanism comprising:
a plurality of flow path forming members joined together and forming a flow path through which a fluid flows; and
a sealing member joined to the flow path forming members,
at least one or more than one of the flow path forming members and the sealing member being a resin molded product having a surface comprising:
an opening constituting or including a portion of the flow path;
a protrusion surrounding the circumference of the opening; and
a rib having one of its opposite ends connected to a part of the protrusion and the other end located inside or outside of the protrusion,
the protrusion having at the top thereof a contact region pressed against and held in contact with a counterpart member joined to the member that is at least one or more than one of the flow path forming members and the sealing member,
wherein the member that is at least one or more than one of the flow path forming members and the sealing member is made of a resin material showing a melt flow rate (MFR) of not more than 50 g/10 min.

* * * * *